United States Patent
Lee et al.

(10) Patent No.: US 11,469,811 B2
(45) Date of Patent: Oct. 11, 2022

(54) OPERATION METHOD OF TERMINAL IN WIRELESS COMMUNICATION SYSTEM AND TERMINAL SUPPORTING SAME

(71) Applicant: LG ELECTRONICS INC., Seoul (KR)

(72) Inventors: Kilbom Lee, Seoul (KR); Jiwon Kang, Seoul (KR); Kijun Kim, Seoul (KR); Sukhyon Yoon, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 38 days.

(21) Appl. No.: 17/272,774

(22) PCT Filed: Sep. 6, 2019

(86) PCT No.: PCT/KR2019/011551
§ 371 (c)(1),
(2) Date: Mar. 2, 2021

(87) PCT Pub. No.: WO2020/050682
PCT Pub. Date: Mar. 12, 2020

(65) Prior Publication Data
US 2021/0320711 A1    Oct. 14, 2021

(30) Foreign Application Priority Data
Sep. 6, 2018    (KR) .................. 10-2018-0106770

(51) Int. Cl.
*H04B 7/08*    (2006.01)
*H04W 16/28*    (2009.01)
(Continued)

(52) U.S. Cl.
CPC ............ *H04B 7/088* (2013.01); *H04W 16/28* (2013.01); *H04W 74/0833* (2013.01); *H04W 76/19* (2018.02); *H04W 80/02* (2013.01)

(58) Field of Classification Search
CPC ...... H04B 7/088; H04B 7/0695; H04B 7/024; H04W 16/28; H04W 74/0833; H04W 76/19; H04W 80/02
See application file for complete search history.

(56) References Cited

U.S. PATENT DOCUMENTS 11,032,760 B2 *    6/2021    Cheng .................. H04L 5/001
2018/0138962 A1    5/2018    Islam et al.
(Continued)

OTHER PUBLICATIONS

PCT International Application No. PCT/KR2019/011551, International Search Report dated Dec. 20, 2019, 14 pages.
(Continued)

*Primary Examiner* — Harry H Kim
(74) *Attorney, Agent, or Firm* — Lee, Hong, Degerman, Kang & Waimey PC

(57) ABSTRACT

The present disclosure proposes an operation method of a terminal operating on the basis of one primary cell (PCell) and one or more secondary cells (SCell) in a wireless communication system, and a terminal supporting same. According to one embodiment applicable to the present disclosure, a terminal may adaptively change a PRACH resource having successfully performed BFR to an uplink beam of an SCell or maintain an uplink beam of an existing SCell, on the basis of whether an uplink beam related to a PCell is possible to be used as an uplink beam related to the SCell. Through this, the terminal may properly manage the uplink beam of the SCell.

17 Claims, 15 Drawing Sheets

(51) Int. Cl.
    *H04W 74/08*     (2009.01)
    *H04W 76/19*     (2018.01)
    *H04W 80/02*     (2009.01)
    *H04B 7/06*     (2006.01)
    *H04B 7/024*     (2017.01)

(56) References Cited

U.S. PATENT DOCUMENTS

| | | | | |
|---|---|---|---|---|
| 2019/0349061 A1* | 11/2019 | Cirik | ................... | H04L 5/005 |
| 2020/0100179 A1* | 3/2020 | Zhou | ................... | H04W 72/042 |
| 2020/0221485 A1* | 7/2020 | Cirik | ................... | H04W 72/042 |
| 2022/0052749 A1* | 2/2022 | Guo | ................... | H04W 72/044 |

OTHER PUBLICATIONS

Huawei et al., "Discussion on BFR for SCell," R1-1809120, 3GPP TSG RAN WG1 Meeting #94, Aug. 2018, 8 pages.
NTT Docomo, "Remaining issues on beam recovery," R1-1807621, 3GPP TSG-RAN WG1 Meeting #93, May 2018, 7 pages.
Nokia et al., "Remaining Details on Beam Recovery," R1-1807185, 3GPP TSG-RAN WG1 Meeting #93, May 2018, 10 pages.
Nokia et al., "Remaining issues on beam management," R1-1809237, 3GPP TSG RAN WG1 Meeting #94, Aug. 2018, 13 pages.

* cited by examiner

OPERATION METHOD OF TERMINAL IN WIRELESS COMMUNICATION SYSTEM AND TERMINAL SUPPORTING SAME

CROSS-REFERENCE TO RELATED APPLICATIONS

This application is the National Stage filing under 35 U.S.C. 371 of International Application No. PCT/KR2019/011551, filed on Sep. 6, 2019, which claims the benefit of earlier filing date and right of priority to KR Application No. 10-2018-0106770, filed on Sep. 6, 2018, the contents of which is incorporated by reference herein in its entirety.

TECHNICAL FIELD

The following description relates to a wireless communication system and, more particularly, to an operation method of a user equipment (UE) based on one primary cell (PCell) and one or more secondary cells (SCells) in a wireless communication system, and a UE supporting the same.

BACKGROUND ART

Wireless access systems have been widely deployed to provide various types of communication services such as voice or data. In general, a wireless access system is a multiple access system that supports communication of multiple users by sharing available system resources (a bandwidth, transmission power, etc.) among them. For example, multiple access systems include a Code Division Multiple Access (CDMA) system, a Frequency Division Multiple Access (FDMA) system, a Time Division Multiple Access (TDMA) system, an Orthogonal Frequency Division Multiple Access (OFDMA) system, and a Single Carrier Frequency Division Multiple Access (SC-FDMA) system.

As more communication devices have demanded higher communication capacity, enhanced mobile broadband (eMBB) communication technology relative to legacy radio access technology (RAT) has been introduced. In addition, a communication system considering services/UEs sensitive to reliability and latency as well as massive machine type communication (MTC) for providing various services anytime and anywhere by connecting a plurality of devices and objects to each other has been introduced. Thus, eMBB communication, massive MTC, ultra-reliable and low-latency communication (URLLC), etc. have been introduced and various configurations therefor have been proposed.

DETAILED DESCRIPTION OF THE DISCLOSURE

Technical Problems

The present disclosure provides an operation method of a UE in a wireless communication system and the UE supporting the same.

It will be appreciated by persons skilled in the art that the objects that could be achieved with the present disclosure are not limited to what has been particularly described hereinabove and the above and other objects that the present disclosure could achieve will be more clearly understood from the following detailed description.

Technical Solutions

The present disclosure provides an operation method of a UE based on one primary cell (PCell) and one or more secondary cells (SCells) in a wireless communication system, and the UE supporting the same.

According to an aspect of the present disclosure, provided herein is an operation method of a user equipment (UE) based on one primary cell (PCell) and one or more secondary cells (SCells) in a wireless communication system, including detecting occurrence of beam failure of a first SCell among the one or more SCells; performing beam failure recovery (BFR) for the first SCell using a physical random access channel (PRACH) resource related to the PCell on the PCell; and, based on a relationship between a first reference signal associated with a PRACH resource on which the BFR is successful and a second reference signal included in a reference signal set related to the first SCell, (i) changing an uplink beam of the first SCell based on the PRACH resource on which the BFR is successful or (ii) maintaining the uplink beam of the first SCell.

Detecting occurrence of beam failure of the first SCell may include declaring one beam failure instance, by a physical layer of the UE, based on quality of all physical downlink control channel (PDCCH) signals related to the first SCell being equal to or less than a predetermined threshold; and declaring beam failure, by a media access control (MAC) layer of the UE, based on occurrence of the beam failure instance by a preset number of times.

In the present disclosure, the PRACH resource used for the BFR for the first SCell may (i) have a correlation relation with a reference signal related to the PCell, and (ii) be related to a PRACH resource for contention-based random access (CBRA).

In the present disclosure, the reference signal set related to the first SCell may be configured through higher-layer signaling received from a base station.

As a specific example applicable to the present disclosure, based on the first reference signal having a spatial quasi-colocation (QCL) relation with any one second reference signal included in the reference signal set related to the first SCell, the UE may change the uplink beam of the first SCell based on the PRACH resource on which the BFR is successful. In contrast, based on the first reference signal having no spatial QCL with all second reference signals included in the reference signal set related to the first SCell, the UE may maintain the uplink beam of the first SCell.

More specifically, based on the first signal having the spatial QCL relation with any one second reference signal included in the reference signal set related to the first SCell, the UE may change the uplink beam of the first SCell based on the PRACH resource on which the BFR is successful, after a predetermined number of symbols from a time at which the UE receives a random access channel (RACH) response (RAR) from a base station.

Alternatively, based on the first reference signal having no spatial QCL relation with all second reference signals included in the reference signal set related to the first SCell, the UE may additionally perform the following operations:
  transmitting a first signal including at least one of (i) identification information of the first SCell, (ii) information indicating that beam failure of the first SCell has occurred, and (iii) beam information related to the first SCell preferred by the UE, to a base station, as a response to random access channel (RACH) response (RAR); and
  expecting that the uplink beam of the first SCell will be reconfigured through a second signal related to a response signal to the first signal.

In the present disclosure, the uplink beam of the first SCell may be related to a physical uplink control channel (PUCCH) beam of the first SCell.

In another aspect of the present disclosure, provided herein is a user equipment (UE) operating based on one primary cell (PCell) and one or more secondary cells (SCells) in a wireless communication system, including at least one transmitter; at least one receiver; at least one processor; and at least one memory operably connected to the at least one processor, for storing instructions for causing the at least one processor to perform a specific operation when the instructions are executed. The specific operation includes detecting occurrence of beam failure of a first SCell among the one or more SCells; performing beam failure recovery (BFR) for the first SCell using a physical random access channel (PRACH) resource related to the PCell on the PCell; and, based on a relationship between a first reference signal associated with a PRACH resource on which the BFR is successful and a second reference signal included in a reference signal set related to the first SCell, (i) changing an uplink beam of the first SCell based on the PRACH resource on which the BFR is successful or (ii) maintaining the uplink beam of the first SCell.

The UE may communicate with at least one of a mobile terminal, a network, or an autonomous driving vehicle other than a vehicle in which the UE is included.

Detecting occurrence of beam failure of the first SCell may include declaring one beam failure instance, by a physical layer of the UE, based on quality of all physical downlink control channel (PDCCH) signals related to the first SCell being equal to or less than a predetermined threshold; and declaring beam failure, by a media access control (MAC) layer of the UE, based on occurrence of the beam failure instance by a preset number of times.

In the present disclosure, the PRACH resource used for the BFR for the first SCell may (i) have a correlation relation with a reference signal related to the PCell, and (ii) be related to a PRACH resource for contention-based random access (CBRA).

In the present disclosure, the reference signal set related to the first SCell may be configured through higher-layer signaling received from a base station.

As a specific example applicable to the present disclosure, based on the first reference signal having a spatial quasi-colocation (QCL) relation with any one second reference signal included in the reference signal set related to the first SCell, the UE may change the uplink beam of the first SCell based on the PRACH resource on which the BFR is successful. In contrast, based on the first reference signal having no spatial QCL with all second reference signals included in the reference signal set related to the first SCell, the UE may maintain the uplink beam of the first SCell.

More specifically, based on the first signal having the spatial QCL relation with any one second reference signal included in the reference signal set related to the first SCell, the UE may change the uplink beam of the first SCell based on the PRACH resource on which the BFR is successful, after a predetermined number of symbols from a time at which the UE receives a random access channel (RACH) response (RAR) from a base station.

Alternatively, based on the first reference signal having no spatial QCL relation with all second reference signals included in the reference signal set related to the first SCell, the UE may additionally perform the following operations:

transmitting a first signal including at least one of (i) identification information of the first SCell, (ii) information indicating that beam failure of the first SCell has occurred, and (iii) beam information related to the first SCell preferred by the UE, to a base station, as a response to random access channel (RACH) response (RAR); and expecting that the uplink beam of the first SCell will be reconfigured through a second signal related to a response signal to the first signal.

In the present disclosure, the uplink beam of the first SCell may be related to a physical uplink control channel (PUCCH) beam of the first SCell.

The above aspects of the present disclosure are merely some parts of exemplary embodiments of the present disclosure and various embodiments into which the technical features of the present disclosure are incorporated may be derived and understood by persons skilled in the art from the following detailed description of the present disclosure.

Advantageous Effects

Embodiments of the present disclosure have the following effects.

According to the present disclosure, when an uplink beam related to a PCell is unusable as an uplink beam an SCell, a UE may be prevented from unconditionally changing the uplink beam of the SCell based on beam failure recovery (BFR). Thereby, even when BFR through the PCell is successful, the UE may determine whether a physical random access channel (PARCH) resource on which BFR is successful is usable for the SCell and properly manage the uplink beam of the SCell based on the determination result.

It will be appreciated by persons skilled in the art that the effects that could be achieved with the present disclosure are not limited to what has been particularly described hereinabove and other advantages of the present disclosure will be more clearly understood from the following detailed description.

DESCRIPTION OF DRAWINGS

The accompanying drawings, which are included to provide a further understanding of the disclosure, provide embodiments of the present disclosure together with detail explanation. Yet, a technical characteristic of the present disclosure is not limited to a specific drawing. Characteristics disclosed in each of the drawings are combined with each other to configure a new embodiment. Reference numerals in each drawing correspond to structural elements.

BEST MODE FOR CARRYING OUT THE DISCLOSURE

Figure 1:
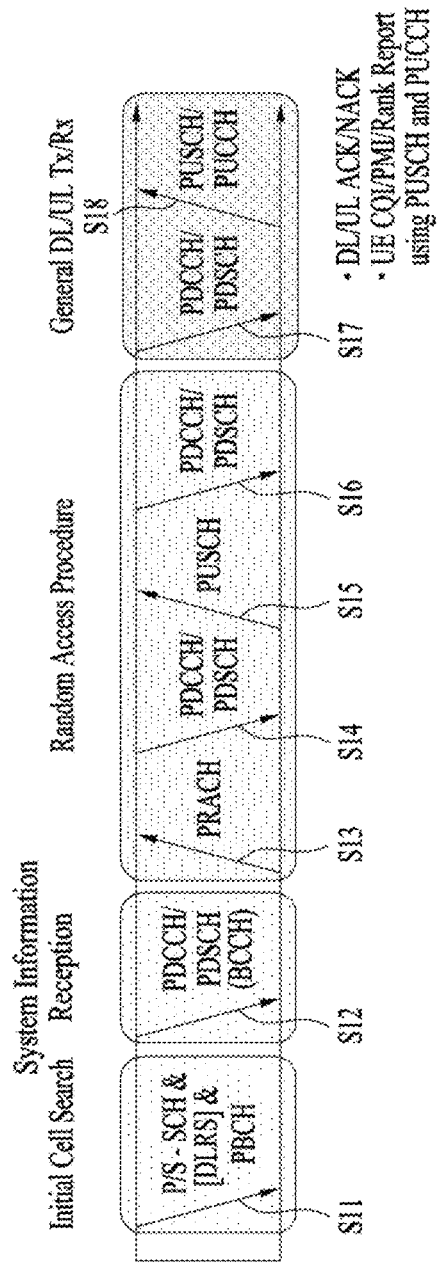
FIG. 1 is a diagram illustrating physical channels and a general signal transmission method using the physical channels.

The embodiments of the present disclosure described below are combinations of elements and features of the present disclosure in specific forms. The elements or features may be considered selective unless otherwise mentioned. Each element or feature may be practiced without being combined with other elements or features. Further, an embodiment of the present disclosure may be constructed by combining parts of the elements and/or features. Operation orders described in embodiments of the present disclosure may be rearranged. Some constructions or elements of any one embodiment may be included in another embodiment and may be replaced with corresponding constructions or features of another embodiment.

In the description of the attached drawings, a detailed description of known procedures or steps of the present disclosure will be avoided lest it should obscure the subject matter of the present disclosure. In addition, procedures or steps that could be understood to those skilled in the art will not be described either.

Throughout the specification, when a certain portion "includes" or "comprises" a certain component, this indicates that other components are not excluded and may be further included unless otherwise noted. The terms "unit", "-or/er" and "module" described in the specification indicate a unit for processing at least one function or operation, which may be implemented by hardware, software or a combination thereof. In addition, the terms "a or an", "one", "the" etc. may include a singular representation and a plural representation in the context of the present disclosure (more particularly, in the context of the following claims) unless indicated otherwise in the specification or unless context clearly indicates otherwise.

In the embodiments of the present disclosure, a description is mainly made of a data transmission and reception relationship between a base station (BS) and a user equipment (UE). A BS refers to a UE node of a network, which directly communicates with a UE. A specific operation described as being performed by the BS may be performed by an upper node of the BS.

Namely, it is apparent that, in a network comprised of a plurality of network nodes including a BS, various operations performed for communication with a UE may be performed by the BS, or network nodes other than the BS. The term 'BS' may be replaced with a fixed station, a Node B, an evolved Node B (eNode B or eNB), gNode B (gNB), an advanced base station (ABS), an access point, etc.

In the embodiments of the present disclosure, the term UE may be replaced with a UE, a mobile station (MS), a subscriber station (SS), a mobile subscriber station (MSS), a mobile UE, an advanced mobile station (AMS), etc.

A transmission end is a fixed and/or mobile node that provides a data service or a voice service and a reception end is a fixed and/or mobile node that receives a data service or a voice service. Therefore, a UE may serve as a transmission end and a BS may serve as a reception end, on an uplink (UL). Likewise, the UE may serve as a reception end and the BS may serve as a transmission end, on a downlink (DL).

The embodiments of the present disclosure may be supported by standard specifications disclosed for at least one of wireless access systems including an institute of electrical and electronics engineers (IEEE) 802.xx system, a 3rd generation partnership project (3GPP) system, a 3GPP long term evolution (LTE) system, 3GPP 5G NR system and a 3GPP2 system. In particular, the embodiments of the present disclosure may be supported by the standard specifications, 3GPP TS 38.211, 3GPP TS 38.212, 3GPP TS 38.213, 3GPP TS 38.321 and 3GPP TS 38.331. That is, the steps or parts, which are not described to clearly reveal the technical idea of the present disclosure, in the embodiments of the present disclosure may be explained by the above standard specifications. All terms used in the embodiments of the present disclosure may be explained by the standard specifications.

Reference will now be made in detail to the embodiments of the present disclosure with reference to the accompanying drawings. The detailed description, which will be given below with reference to the accompanying drawings, is intended to explain exemplary embodiments of the present disclosure, rather than to show the only embodiments that can be implemented according to the disclosure.

The following detailed description includes specific terms in order to provide a thorough understanding of the present disclosure. However, it will be apparent to those skilled in the art that the specific terms may be replaced with other terms without departing the technical spirit and scope of the present disclosure.

Hereinafter, 3GPP NR system is explained, which are examples of wireless access systems.

Technology described below may be applied to various wireless access systems such as code division multiple access (CDMA), frequency division multiple access (FDMA), time division multiple access (TDMA), orthogonal frequency division multiple access (OFDMA), and single carrier frequency division multiple access (SC-FDMA).

To clarify technical features of the present disclosure, embodiments of the present disclosure are described focusing upon a 3GPP NR system. However, the embodiments proposed in the present disclosure may be equally applied to other wireless systems (e.g., 3GPP LTE, IEEE 802.16, and IEEE 802.11).

1. NR System 1.1. Physical Channels and General Signal Transmission

In a wireless access system, a UE receives information from a base station on a DL and transmits information to the base station on a UL. The information transmitted and received between the UE and the base station includes general data information and various types of control information. There are many physical channels according to the types/usages of information transmitted and received between the base station and the UE.

FIG. 1 illustrates physical channels and a general signal transmission method using the physical channels, which may be used in embodiments of the present disclosure.

A UE performs initial cell search such as synchronization establishment with a BS in step S11 when the UE is powered on or enters a new cell. To this end, the UE may receive a primary synchronization channel (P-SCH) and a secondary synchronization channel (S-SCH) from the BS, establish synchronization with the BS, and acquire information such as a cell identity (ID).

Thereafter, the UE may receive a physical broadcast channel (PBCH) from the BS to acquire broadcast information in the cell.

Meanwhile, the UE may receive a DL reference signal (RS) in the initial cell search step to confirm a DL channel state.

Upon completion of initial cell search, the UE may receive a physical downlink control channel (PDCCH) and a physical downlink shared channel (PDSCH) according to information included in the PDCCH to acquire more detailed system information in step S12.

Next, the UE may perform a random access procedure such as steps S13 to S16 to complete access to the BS. To this end, the UE may transmit a preamble through a physical random access channel (PRACH) (S13) and receive a random access response (RAR) to the preamble through the PDCCH and the PDSCH corresponding to the PDCCH (S14). The UE may transmit a physical uplink shared channel (PUSCH). In the case of contention-based random access, a contention resolution procedure including transmission of a PRACH signal (S15) and reception of a PDCCH signal and a PDSCH signal corresponding to the PDCCH signal (S16) may be additionally performed.

The UE which has performed the above procedures may receive a PDCCH signal and/or a PDSCH signal (S17) and transmit a PUSCH signal and/or a physical uplink control channel (PUCCH) signal (S18) as a general UL/DL signal transmission procedure.

Control information that the UE transmits to the BS is referred to as uplink control information (UCI). The UCI includes a hybrid automatic repeat and request (HARQ) acknowledgement (ACK)/negative ACK (NACK) signal, a scheduling request (SR), a channel quality indicator (CQI), a precoding matrix index (PMI), a rank indicator (RI), or beam indication (BI) information.

In an NR system, the UCI is generally periodically transmitted on the PUCCH. However, according to an embodiment (if control information and traffic data should be transmitted simultaneously), the control information and traffic data may be transmitted on the PUSCH. In addition, the UCI may be transmitted aperiodically on the PUSCH, upon receipt of a request/command from a network.

1.2. Radio Frame Structure

Figure 2:
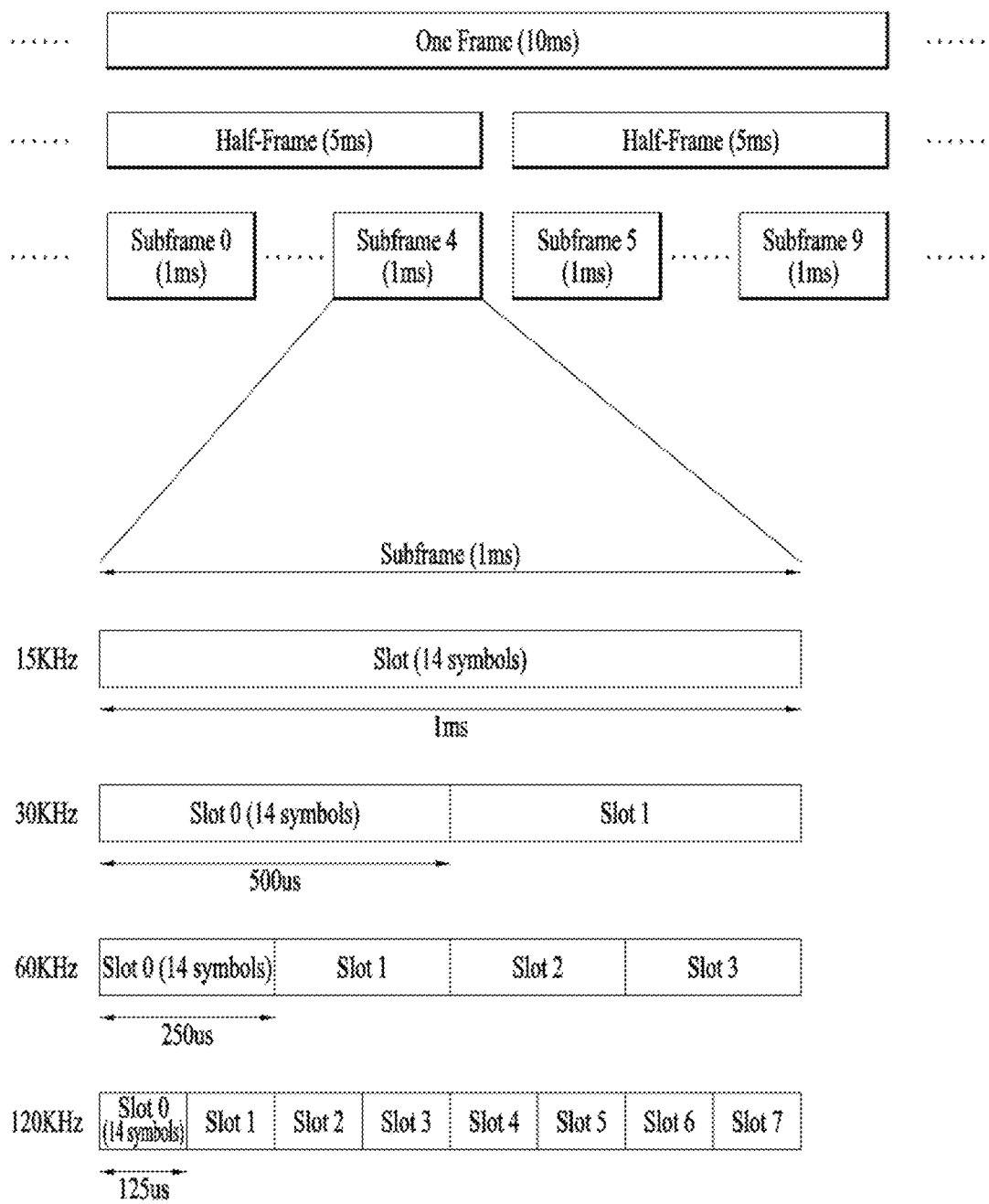
FIG. 2 is a diagram illustrating a radio frame structure in an NR system to which embodiments of the present disclosure are applicable.

FIG. 2 is a diagram illustrating a radio frame structure in an NR system to which embodiments of the present disclosure are applicable.

In the NR system, UL and DL transmissions are based on a frame as illustrated in FIG. 2. One radio frame is 10 ms in duration, defined by two 5-ms half-frames. One half-frame is defined by five 1-ms subframes. One subframe is divided into one or more slots, and the number of slots in a subframe depends on an SCS. Each slot includes 12 or 14 OFDM(A) symbols according to a CP. Each slot includes 14 symbols in a normal CP case, and 12 symbols in an extended CP case. Herein, a symbol may include an OFDM symbol (or a CP-OFDM) symbol) and an SC-FDMA symbol (or a DFT-s-OFDM symbol).

Table 1 lists the number of symbols per slot, the number of slots per frame, and the number of slots per subframe in the normal CP case, and Table 2 lists the number of symbols per slot, the number of slots per frame, and the number of slots per subframe in the extended CP case.

TABLE 1

| μ | $N_{symb}^{slot}$ | $N_{slot}^{frame,\mu}$ | $N_{slot}^{subframe,\mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |
| 5 | 14 | 320 | 32 |

TABLE 2

| μ | $N_{symb}^{slot}$ | $N_{slot}^{frame,\mu}$ | $N_{slotsubframe,\mu}$ |
|---|---|---|---|
| 2 | 12 | 40 | 4 |

In the above tables, $N^{slot}_{symb}$ represents the number of symbols in a slot, $N^{frame,\mu}_{slot}$ represents the number of slots in a frame, and $N^{subframe,\mu}_{slot}$ represents the number of slots in a subframe.

In the NR system to which the present disclosure is applicable, different OFDM(A) numerologies (e.g., SCSs, CP length, and so on) may be configured for a plurality of cells aggregated for a UE. Therefore, the (absolute) duration of a time resource (e.g., an SF, slot, or TTI) (for the convenience of description, generically referred to as a time unit (TU)) including the same number of symbols may be different between the aggregated cells.

Figure 3:
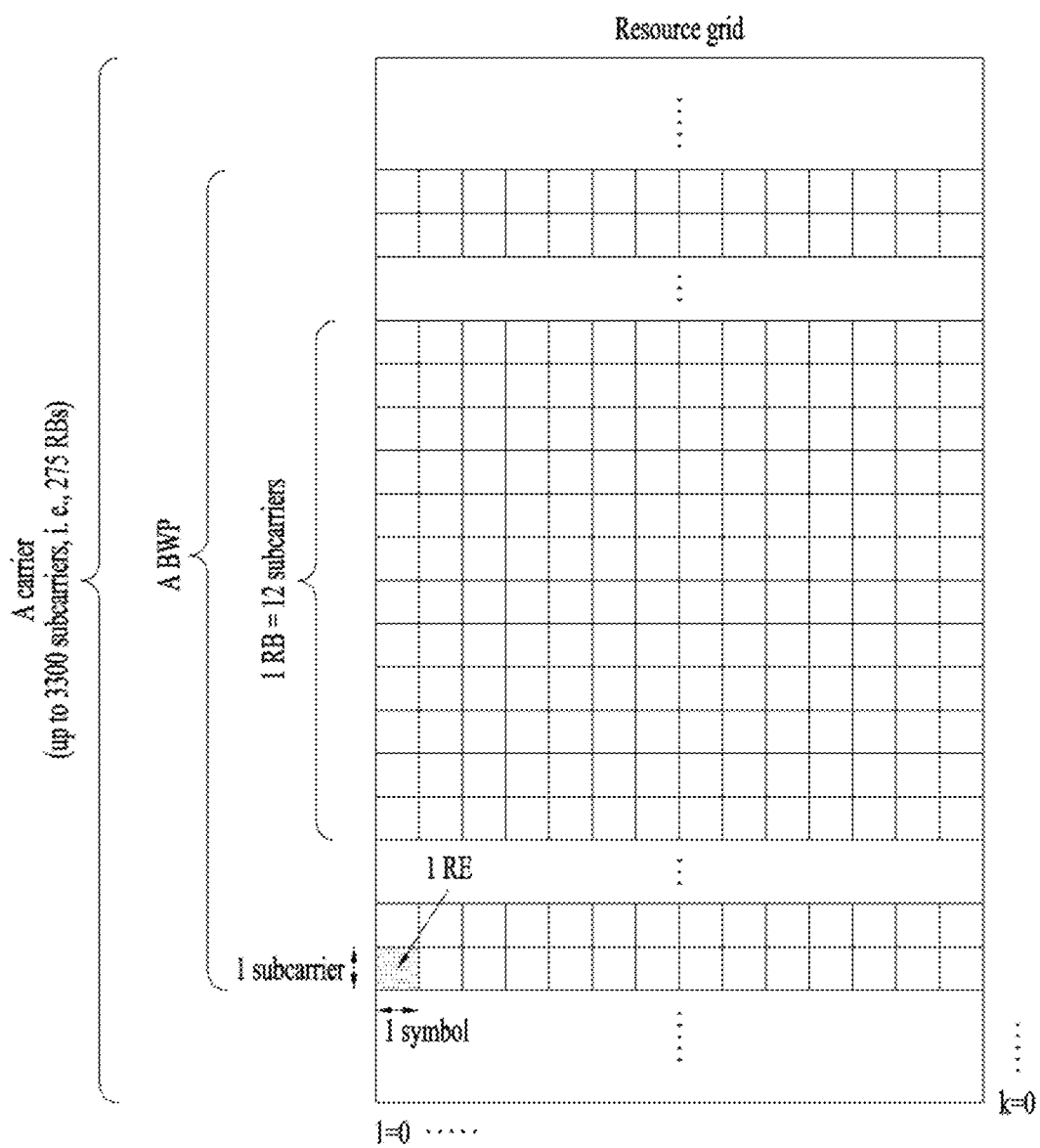
FIG. 3 is a diagram illustrating a slot structure in an NR system to which embodiments of the present disclosure are applicable.

FIG. 3 is a diagram illustrating a slot structure in an NR system to which embodiments of the present disclosure are applicable.

One slot includes a plurality of symbols in the time domain. For example, one slot includes 7 symbols in a normal CP case and 6 symbols in an extended CP case.

A carrier includes a plurality of subcarriers in the frequency domain. An RB is defined by a plurality of (e.g., 12) consecutive subcarriers in the frequency domain.

A bandwidth part (BWP), which is defined by a plurality of consecutive (P)RBs in the frequency domain, may correspond to one numerology (e.g., subcarrier spacing (SCS), CP length, and so on).

A carrier may include up to N (e.g., 5) BWPs. Data communication may be conducted in an activated BWP, and only one BWP may be activated for one UE. In a resource grid, each element is referred to as an RE, to which one complex symbol may be mapped.

Figure 4:
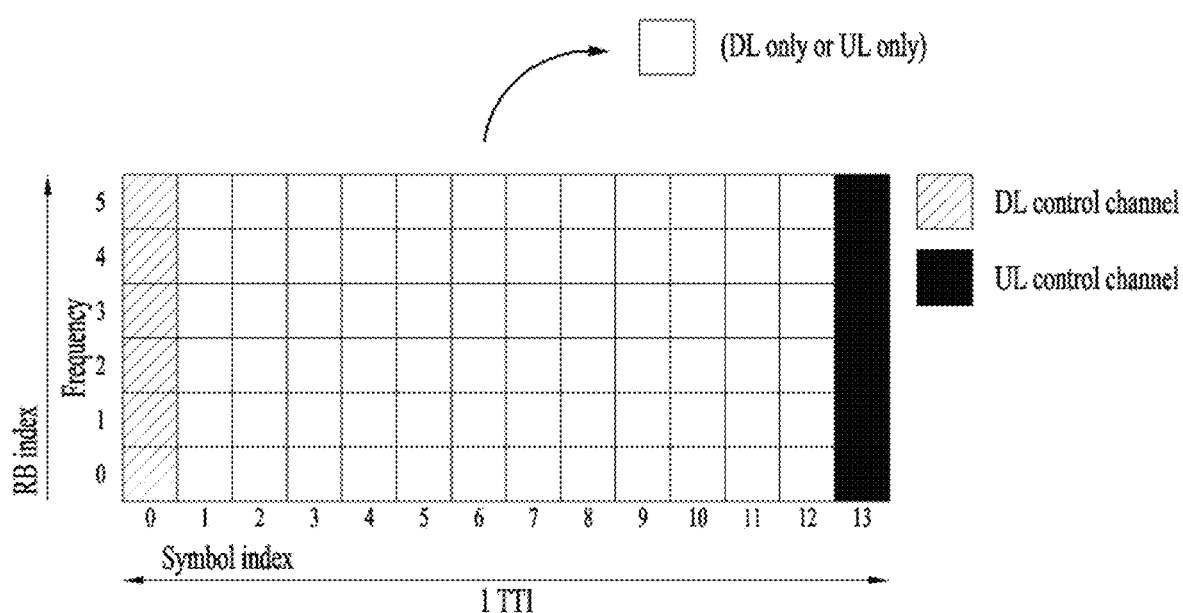
FIG. 4 is a diagram illustrating a self-contained slot structure in an NR system to which embodiments of the present disclosure are applicable

FIG. 4 is a diagram illustrating a self-contained slot structures in an NR system to which embodiments of the present disclosure are applicable.

In FIG. 4, the hatched area (e.g., symbol index=0) indicates a DL control region, and the black area (e.g., symbol index=13) indicates a UL control region. The remaining area (e.g., symbol index=1 to 12) may be used for DL or UL data transmission.

Based on this structure, a base station and a UE may sequentially perform DL transmission and UL transmission in one slot. That is, the base station and UE may transmit and receive not only DL data but also a UL ACK/NACK for the DL data in one slot. Consequently, this structure may reduce a time required until data retransmission when a data transmission error occurs, thereby minimizing the latency of a final data transmission.

In this self-contained slot structure, a predetermined length of time gap is required to allow the base station and UE to switch from transmission mode to reception mode and vice versa. To this end, in the self-contained slot structure, some OFDM symbols at the time of switching from DL to UL may be configured as a guard period (GP).

Although it has been described above that the self-contained slot structure includes both DL and UL control regions, these control regions may be selectively included in the self-contained slot structure. In other words, the self-contained slot structure according to the present disclosure may include either the DL control region or the UL control region as well as both the DL and UL control regions as illustrated in FIG. 4.

Further, the order of the regions in one slot may vary according to embodiments. For example, one slot may be configured in the order of DL control region, DL data region, UL control region, and UL data region, or UL control region, UL data region, DL control region, and DL data region.

A PDCCH may be transmitted in the DL control region, and a PDSCH may be transmitted in the DL data region. A PUCCH may be transmitted in the UL control region, and a PUSCH may be transmitted in the UL data region.

The PDCCH may deliver downlink control information (DCI), for example, DL data scheduling information, UL data scheduling information, and so on. The PUCCH may deliver uplink control information (UCI), for example, an ACK/NACK for DL data, channel state information (CSI), a scheduling request (SR), and so on.

The PDSCH conveys DL data (e.g., DL-shared channel transport block (DL-SCH TB)) and uses a modulation scheme such as quadrature phase shift keying (QPSK), 16-ary quadrature amplitude modulation (16QAM), 64QAM, or 256QAM. A TB is encoded into a codeword. The PDSCH may deliver up to two codewords. Scrambling and modulation mapping are performed on a codeword basis, and modulation symbols generated from each codeword are mapped to one or more layers (layer mapping). Each layer together with a demodulation reference signal (DMRS) is mapped to resources, generated as an OFDM symbol signal, and transmitted through a corresponding antenna port.

The PDCCH carries DCI and uses QPSK as a modulation scheme. One PDCCH includes 1, 2, 4, 8, or 16 control channel elements (CCEs) according to an aggregation level (AL). One CCE includes 6 resource element groups (REGs). One REG is defined by one OFDM symbol by one (P)RB.

Figure 5:
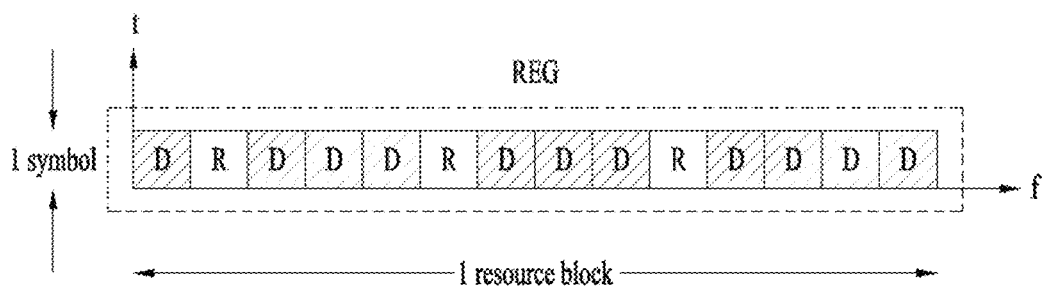
FIG. 5 is a diagram illustrating the structure of one REG in an NR system to which embodiments of the present disclosure are applicable.

FIG. 5 is a diagram illustrating the structure of one REG in an NR system to which embodiments of the present disclosure are applicable.

In FIG. 5, D represents an RE to which DCI is mapped, and R represents an RE to which a DMRS is mapped. The DMRS is mapped to REs #1, #5, and #9 along the frequency axis in one symbol.

The PDCCH is transmitted in a control resource set (CORESET). A CORESET is defined as a set of REGs having a given numerology (e.g., SCS, CP length, and so on). A plurality of CORESETs for one UE may overlap with each other in the time/frequency domain. A CORESET may be configured by system information (e.g., a master information block (MIB)) or by UE-specific higher layer (RRC) signaling. Specifically, the number of RBs and the number of symbols (up to 3 symbols) included in a CORESET may be configured by higher-layer signaling.

The PUSCH delivers UL data (e.g., UL-shared channel transport block (UL-SCH TB)) and/or UCI based on a CP-OFDM waveform or a DFT-s-OFDM waveform. When the PUSCH is transmitted in the DFT-s-OFDM waveform, the UE transmits the PUSCH by transform precoding. For example, when transform precoding is impossible (e.g., disabled), the UE may transmit the PUSCH in the CP-OFDM waveform, while when transform precoding is possible (e.g., enabled), the UE may transmit the PUSCH in the CP-OFDM or DFT-s-OFDM waveform. A PUSCH transmission may be dynamically scheduled by a UL grant in DCI, or semi-statically scheduled by higher-layer (e.g., RRC) signaling (and/or layer 1 (L1) signaling such as a PDCCH) (configured grant). The PUSCH transmission may be performed in a codebook-based or non-codebook-based manner.

The PUCCH delivers UCI, an HARQ-ACK, and/or an SR and is classified as a short PUCCH or a long PUCCH according to the transmission duration of the PUCCH. Table 3 lists exemplary PUCCH formats.

TABLE 3

| PUCCH format | Length in OFDM symbols $N_{symb}^{PUCCH}$ | Number of bits | Usage | Etc |
|---|---|---|---|---|
| 0 | 1 - 2 | ≤2 | HARQ SR | Sequence selection |
| 1 | 4 - 14 | ≤2 | HARQ, [SR] | Sequence modulation |
| 2 | 1 - 2 | >2 | HARQ, CSI, [SR] | CP-OFDM |
| 3 | 4 - 14 | >2 | HARQ, CSI, [SR] | DFT-s-OFDM (no UE multiplexing) |
| 4 | 4 - 14 | >2 | HARQ. CSI, [SR] | DFT-s-OFDM (Pre DFT OCC) |

PUCCH format 0 conveys UCI of up to 2 bits and is mapped in a sequence-based manner, for transmission. Specifically, the UE transmits specific UCI to the base station by transmitting one of a plurality of sequences on a PUCCH of PUCCH format 0. Only when the UE transmits a positive SR, the UE transmits the PUCCH of PUCCH format 0 in a PUCCH resource for a corresponding SR configuration.

PUCCH format 1 conveys UCI of up to 2 bits and modulation symbols of the UCI are spread with an OCC (which is configured differently whether frequency hopping is performed) in the time domain. The DMRS is transmitted in a symbol in which a modulation symbol is not transmitted (i.e., transmitted in time division multiplexing (TDM)).

PUCCH format 2 conveys UCI of more than 2 bits and modulation symbols of the DCI are transmitted in frequency division multiplexing (FDM) with the DMRS. The DMRS is located in symbols #1, #4, #7, and #10 of a given RB with a density of ⅓. A pseudo noise (PN) sequence is used for a DMRS sequence. For 1-symbol PUCCH format 2, frequency hopping may be activated.

PUCCH format 3 does not support UE multiplexing in the same physical resource blocks (PRBs) and conveys UCI of more than 2 bits. In other words, PUCCH resources of PUCCH format 3 do not include an OCC. Modulation symbols are transmitted in TDM with the DMRS.

PUCCH format 4 supports multiplexing of up to 4 UEs in the same PRBs and conveys UCI of more than 2 bits. In other words, PUCCH resources of PUCCH format 3 includes an OCC. Modulation symbols are transmitted in TDM with the DMRS.

1.3. Synchronization Signal Block (SSB) or SS/PBCH Block

In the NR system to which the present disclosure is applicable, a primary synchronization signal (PSS), a secondary synchronization signal (SSS), and/or a physical broadcast channel (PBCH) may be transmitted within one synchronization signal (SS) block or synchronization signal PBCH block (hereinafter, referred to as an SS block or an SS/PBCH block). In this case, multiplexing different signals within one SS block is not precluded.

The SS/PBCH block may be transmitted in a band other than the center of a system band. In particular, when a gNB supports a wideband operation, the gNB may transmit a plurality of SS/PBCH blocks.

Figure 6:
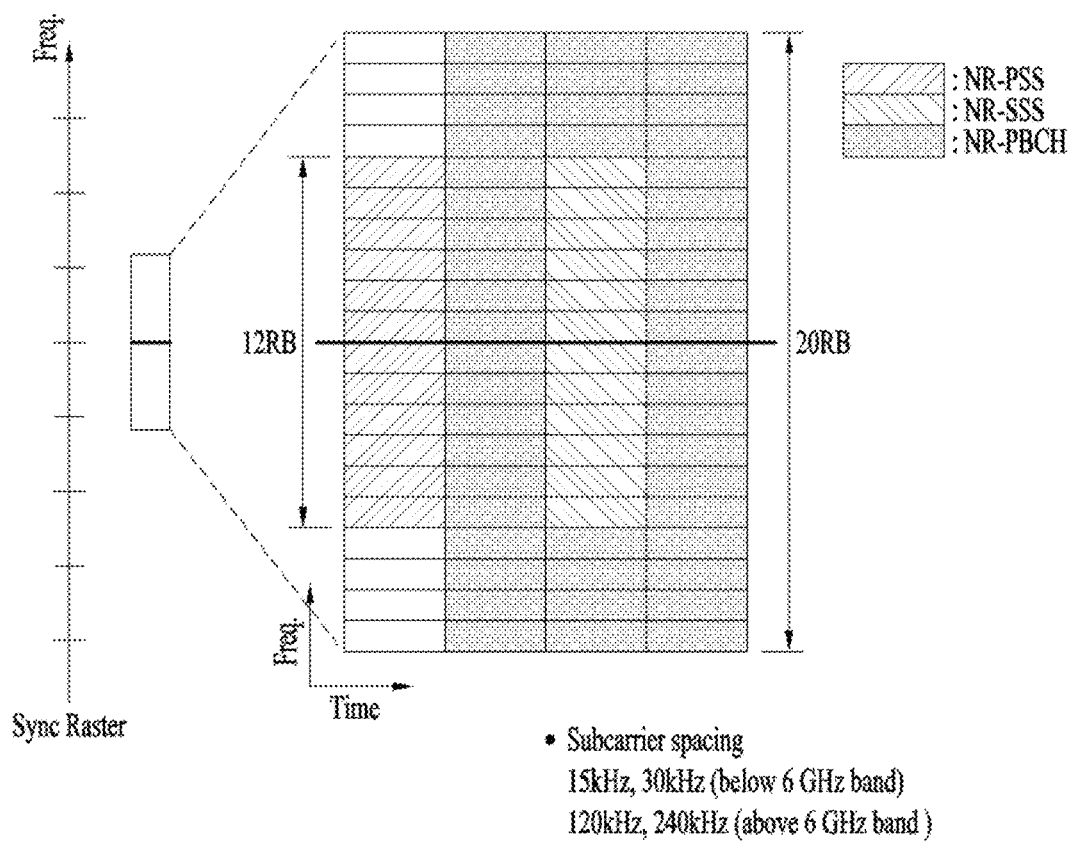
FIG. 6 is a diagram schematically illustrates an SS/PBCH block applicable to the present disclosure.

FIG. 6 schematically illustrates an SS/PBCH block applicable to the present disclosure.

As illustrated in FIG. 6, the SS/PBCH block applicable to the present disclosure may be composed of 20 RBs in 4 consecutive symbols. The SS/PBCH block may include a PSS, an SSS, and a PBCH. A UE may perform cell search, system information acquisition, beam arrangement for initial access, and DL measurement, based on the SS/PBCH block.

Each of the PSS and the SSS includes one OFDM symbol and 127 subcarriers, and the PBCH includes three OFDM symbols and 576 subcarriers. Polar coding and QPSK are applied to the PBCH. The PBCH includes data REs and DMRS REs in every OFDM symbol. There are three DMRS REs per RB, with three data REs between DMRS REs. The locations of DMRS REs may be determined based on a cell ID (e.g., a subcarrier index mapped based on the value of $N^{cell}_{ID}$ mode 4 may be determined.)

Further, the SS/PBCH block may be transmitted even in a frequency band other than the center frequency of a frequency band used by a network.

To this end, a synchronization raster, which is candidate frequency positions at which the UE should detect the SS/PBCH block, is defined in the NR system to which the present disclosure is applicable. The synchronization raster may be distinguished from a channel raster.

In the absence of explicit signaling of the position of the SS/PBCH block, the synchronization raster may indicate available frequency positions for the SS/PBCH block, at which the UE may acquire system information.

The synchronization raster may be determined based on a global synchronization channel number (GSCN). The GSCN may be transmitted by RRC signaling (e.g., an MIB, a system information block (SIB), remaining minimum system information (RMSI), or other system information (OSI)).

The synchronization raster is defined to be longer along the frequency axis than the channel raster and is characterized by a smaller number of blind detections than the channel raster, in consideration of the complexity of initial synchronization and a detection speed.

Figure 7:
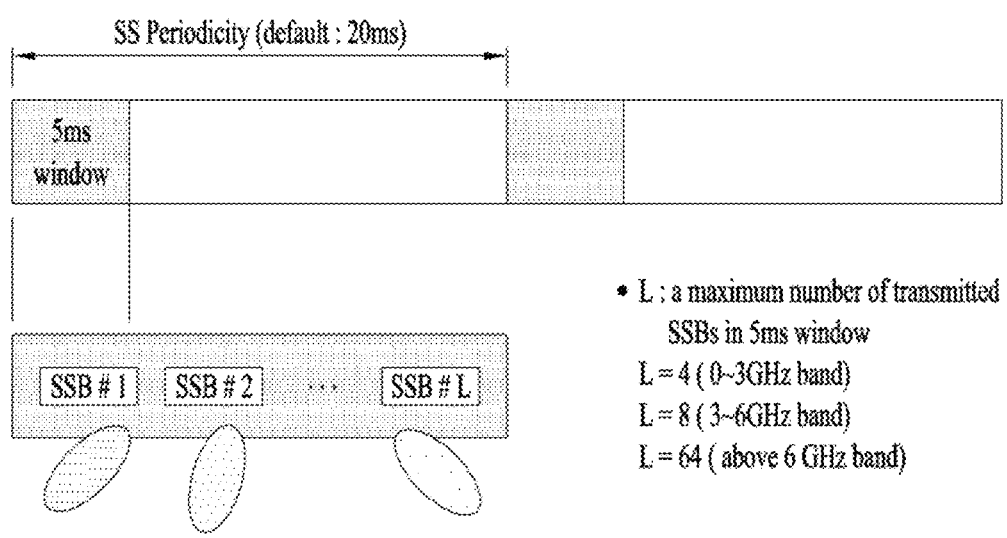
FIG. 7 is a diagram schematically illustrating an SS/PBCH block transmission structure applicable to the present disclosure.

FIG. 7 is a diagram schematically illustrating an SS/PBCH block transmission structure applicable to the present disclosure.

In the NR system to which the present disclosure is applicable, the gNB may transmit an SS/PBCH block up to 64 times for 5 ms. The multiple SS/PBCH blocks may be transmitted on different beams, and the UE may detect the SS/PBCH block on the assumption that the SS/PBCH block is transmitted on a specific one beam every 20 ms.

As the frequency band is higher, the gNB may set a larger maximum number of beams available for SS/PBCH block transmission within 5 ms. For example, the gNB may transmit the SS/PBCH block using up to 4 different beams at or below 3 GHz, up to 8 different beams at 3 to 6 GHz, and up to 64 different beams at or above 6 GHz, for 5 ms.

1.4. Synchronization Procedure

The UE may perform synchronization by receiving the SS block from the gNB. In this case, the synchronization procedure may mainly include a cell ID detection step and a timing detection step. In this case, the cell ID detection step may include a cell ID detection step based on a PSS and a cell ID detection step based on an SSS (e.g., one physical layer cell ID is detected from a total of 1008 physical layer cell IDs). In addition, the timing detection step may include a timing detection step based on PBCH DMRSs and a timing detection step based on PBCH content (e.g., an MIB).

For this purpose, the UE may assume that reception occasions of the PBCH, the PSS, and the SSS are present in consecutive symbols. (That is, the UE may assume that the PBCH, the PSS, and the SSS constitute the SS/BCH block as described above.) Next, the UE may assume that the SSS, the PBCH DMRS, and the PBCH data have the same energy per resource element (EPRE). In this case, the UE may assume that the ratio of PSS EPRE to SSS EPRE of the SS/PBCH block in a corresponding cell is 0 dB or 3 dB. Alternatively, when dedicated higher layer parameters are not provided to the UE, the UE that monitors a PDCCH for DCI format 1_0 with a cyclic redundancy check (CRC) scrambled by a system information-random network temporary identifier (SI-RNTI), a paging-random network temporary identifier (P-RNTI), or a random access-random network temporary identifier (RA-RNTI) may assume that the ratio of PDCCH DMRS EPRE to SSS EPRE is –8 dB to 8 dB.

First, the UE may acquire time synchronization and a physical cell ID of a detected cell by detecting the PSS and the SSS. More specifically, the UE may acquire a symbol timing for an SS block by detecting the PSS and detect a cell ID in a cell ID group. Next, the UE detects the cell ID group by detecting the SSS.

The UE may detect a time index (e.g., a slot boundary) of an SS block from the DMRS of the PBCH. Next, the UE may acquire information about a half frame boundary and information about a system frame number (SFN) from the MIB included in the PBCH.

In this case, the PBCH may indicate that a related (or corresponding) RMSI PDCCH/PDSCH is transmitted in the same band as or a different band from the SS/PBCH block. Accordingly, the UE may receive RMSI (e.g., system information other than the MIB) transmitted in a frequency band indicated by the PBCH after decoding the PBCH or transmitted thereafter in a frequency band in which the PBCH is transmitted.

For a half frame with SS/PBCH blocks, the first symbol indexes for candidate SS/PBCH blocks are determined according to an SCS of SS/PBCH blocks as follows, where index #0 corresponds to the first symbol of the first slot in a half-frame.

(Case A—15 kHz SCS) The first symbols of the candidate SS/PBCH blocks have indexes of {2, 8}+14*n. For carrier frequencies smaller than or equal to 3 GHz, n=0, 1. For carrier frequencies larger than 3 GHz and smaller than or equal to 6 GHz, n=0, 1, 2, 3.

(Case B—30 kHz SCS) The first symbols of the candidate SS/PBCH blocks have indexes {4, 8, 16, 32}+28*n. For carrier frequencies smaller than or equal to 3 GHz, n=0. For carrier frequencies larger than 3 GHz and smaller than or equal to 6 GHz, n=0, 1.

(Case C—30 kHz SCS) The first symbols of the candidate SS/PBCH blocks have indexes {2, 8}+14*n. For carrier frequencies smaller than or equal to 3 GHz, n=0, 1. For carrier frequencies larger than 3 GHz and smaller than or equal to 6 GHz, n=0, 1, 2, 3.

(Case D—120 kHz SCS) The first symbols of the candidate SS/PBCH blocks have indexes {4, 8, 16, 20}+28*n. For carrier frequencies larger than 6 GHz, n=0, 1, 2, 3, 5, 6, 7, 8, 10, 11, 12, 13, 15, 16, 17, 18.

(Case E—240 kHz SCS) The first symbols of the candidate SS/PBCH blocks have indexes {8, 12, 16, 20, 32, 36, 40, 44}+56*n. For carrier frequencies larger than 6 GHz, n=0, 1, 2, 3, 5, 6, 7, 8.

In relation to the above operation, the UE may acquire system information (SI).

The MIB includes information/parameters for monitoring a PDCCH that schedules a PDSCH carrying system information block 1 (SIB1) and is transmitted by the gNB to the UE on a PBCH in an SS/PBCH block.

The UE may confirm whether a control resource set (CORESET) for a Type0-PDCCH common search space is present based on the MIB. The Type0-PDCCH common search space is a type of PDCCH and is used to transmit the PDCCH that schedules an SI message.

When the Type0-PDCCH common search space is present, the UE may determine (i) a plurality of contiguous RBs and one or more consecutive symbols constituting the CORESET and (ii) a PDCCH occasion (e.g., a time-domain position for PDCCH reception), based on information in the MIB (e.g., pdcch-ConfigSIB1).

When the Type0-PDCCH common search space is not present, pdcch-ConfigSIB1 provides information about a frequency position at which the SSB/SIB1 is present and a frequency range in which the SSB/SIB1 is not present.

SIB1 includes information regarding the availability and scheduling (e.g. a transmission periodicity and/or SI-window size) of remaining SIBs (hereinafter, SIBx where x is an integer equal to or greater than 2). For example, SIB1 may indicate whether SIBx is periodically broadcast or is provided on an on-demand basis (or at the request of the UE). If SIBx is provided on-demand, then SIB1 includes information required for the UE to perform an SI request. SIB1 is transmitted on a PDSCH. The PDCCH that schedules SIB1 is transmitted through the Type0-PDCCH common search space. SIB1 is transmitted on a PDSCH indicated by the PDCCH.

1.5. Synchronization Raster

Synchronization raster refers to a frequency position of an SSB that may be used by the UE to acquire SI when there is no explicit signaling for the position of the SSB. Global synchronization raster is defined for all frequencies. The frequency position of the SSB is defined as $SS_{REF}$ and a corresponding GSCN. Parameters for defining $SS_{REF}$ and the GSCN for all frequency ranges are as follows.

TABLE 5

| Frequency range | SS Block frequency position $SS_{REF}$ | GSCN | Range of GSCN |
|---|---|---|---|
| 0 – 3000 MHz | N $^\wedge$ 1200KHz + M $^\wedge$ 50 kHz N = 1.2499, M ε (1, 3, 5) (Note 1) | 3N + (M–3)/2 | 2 – 7498 |
| 3000 – 24250 MHz | 3000 MHz + N $^\wedge$ 1.44 MHz N = 0.14756 | 7499 + N | 7499 – 22255 |

NOTE I: The derei.kt veitte tor oporr bends witn SOS soeced crhanne rester is M = 3.

Mapping between synchronization raster and an RB of a corresponding SSB may be based on the following table. Such mapping may depend on the total number of RBs allocated in a channel and may be applied to both UL and DL.

TABLE 5

| Resource element index $k$ | 0 |
|---|---|
| Physical resource block number $n_{PRB}$ of the SS block | $n_{PRB} = 10$ |

1.6. DCI Format

In the NR system to which the present disclosure is applicable, the following DCI formats may be supported. First, the NR system may support DCI format 0_0 and DCI format 0_1 as a DCI format for PUSCH scheduling and support DCI format 1_0 and DCI format 1_1 as a DCI format for PDSCH scheduling. In addition, as DCI formats usable for other purposes, the NR system may additionally support DCI format 2_0, DCI format 2_1, DCI format 2_2, and DCI format 2_3.

Herein, DCI format 0_0 is used to schedule a transmission block (TB)-based (or TB-level) PUSCH. DCI format 0_1 may be used to schedule a TB-based (or TB-level) PUSCH or code block group (CBG)-based (or CBG-level) PUSCH (in the case in which CBG-based signal transmission and reception is configured).

In addition, DCI format 1_0 may be used to schedule TB-based (or TB-level) PDSCH. DCI format 1_1 may be used to schedule TB-based (or TB-level) PDSCH or CBG-based (or CBG-level) PDSCH (in the case in which CBG-based signal transmission and reception is configured).

In addition, DCI format 2_0 may be used to notify UEs of a slot format. DCI format 2_1 may be used to notify UEs of PRB(s) and OFDM symbol(s) in which a specific UE assumes that no transmission is intended therefor. DCI format 2_2 may be used to transmit transmission power control (TPC) commands for a PUCCH and a PUSCH. DCI format 2_3 may be used to transmit a group of TPC commands for SRS transmission by one or more UEs.

More specifically, DCI format 1_1 may include modulation and coding scheme (MCS)/new data indicator (NDI)/ redundancy version (RV) fields for TB 1 and further include MCS/NDI/RV fields for TB 2 only when a higher layer parameter maxNrofCodeWordsScheduledByDCI in a higher layer parameter PDSCH-Config is set to n2 (i.e., 2).

In particular, when the higher layer parameter maxNrofCodeWordsScheduledByDCI is set to n2 (i.e., 2), whether a TB is substantially enabled/disabled may be determined by a combination of the MCS field and the RV field. More specifically, when the MCS field for a specific TB has a value of 26 and the RV field for the specific TB has a value of 1, the specific TB may be disabled.

Detailed features of the DCI formats may be supported by 3GPP TS 38.212. That is, obvious steps or parts which are not explained by DCI format-related features may be explained with reference to the above document. In addition, all terms disclosed in the present document may be explained by the above standard document.

1.7. Control Resource Set (CORESET)

One CORESET includes $N^{CORESET}_{RB}$ RBs in the frequency domain and $N^{CORESET}_{symb}$ symbols (having a value of 1, 2, or 3) in the time domain.

One control channel element (CCE) includes 6 resource element groups (REGs) and one REG is equal to one RB in one OFDM symbol. REGs in the CORESET are numbered in a time-first manner. Specifically, the REGs are numbered starting with '0' for the first OFDM symbol and the lowest-numbered RB in the CORESET.

A plurality of CORESETs may be configured for one UE. Each CORESET is related only to one CCE-to-REG mapping.

CCE-to-REG mapping for one CORESET may be interleaved or non-interleaved.

Configuration information for the CORESET may be configured by a higher layer parameter ControlResourceSet IE.

In addition, configuration information for CORESET 0 (e.g., common CORESET) may be configured by a higher layer parameter ControlResourceSetZero IE.

1.8. Antenna Port Quasi-Colocation

One UE may be configured with a list of up to M transmission configuration indicator (TCI) state configurations. The M TCI-state configurations may be configured by a higher layer parameter PDSCH-Config to decode a PDSCH (by the UE) according to a detected PDCCH with DCI intended for the UE and the given serving cell. Herein, M may be determined depending on the capability of the UE.

Each TCI state contains parameters for configuring a quasi-colocation (QCL) relationship between one or two DL reference signals and the DMRS ports of the PDSCH. The QCL relationship is configured by the higher layer parameter qcl-Type1 for a first DL RS and a higher layer parameter qcl-Type2 for a second DL RS (if configured). For the case of two DL RSs, the QCL types should not be the same, regardless of whether the RSs are the same DL RS or different DL RSs. The QCL type corresponding to each DL RS is given by a higher layer parameter qcl-Type within a higher layer parameter QCL-Info and may have one of the following values.

'QCL-TypeA': {Doppler shift, Doppler spread, average delay, delay spread}
'QCL-TypeB': {Doppler shift, Doppler spread}
'QCL-TypeC': {Doppler shift, average delay}
'QCL-TypeD': {Spatial Rx parameter}

The UE receives an activation command used to map up to 8 TCI states to codepoints of a TCI field in the DCI. When a HARQ-ACK signal corresponding to the PDSCH carrying the activation command is transmitted in slot #n, mapping between the TCI states and codepoints of the TCI field in the DCI may be applied starting from slot #(n+3*$N^{subframe, \mu}_{slot}$+1). In this case, $N^{subframe, \mu}_{slot}$ is determined based on Table 1 or Table 2 described above. After the UE receives initial higher layer configuration of TCI states and before the UE receives the activation command, the UE assumes that DMRS port(s) of a PDSCH of a serving cell are quasi-colocated (QCLed) with an SS/PBCH block determined in the initial access procedure with respect to 'QCL-TypeA'. Additionally, the UE may assume that the DMRS port(s) of the PDSCH of the serving cell are QCLed with the SS/PBCH block determined in the initial access procedure also with respect to 'QCL-TypeD' at the above timing.

If a higher layer parameter tci-PresentInDCI is set to 'enabled' for a CORESET scheduling the PDSCH, the UE assumes that the TCI field is present in a PDCCH of DCI format 1_1 transmitted on the CORESET. If the higher layer parameter tci-PresentInDCI is not configured for the CORESET scheduling the PDSCH or the PDSCH is scheduled by DCI format 1_0 and if a time offset between reception of the DL DCI and reception of the corresponding PDSCH is equal to or greater than a threshold Threshold-Sched-Offset (where the threshold is based on UE capability), for determining PDSCH antenna port QCL, the UE assumes that a TCI state or QCL assumption for the PDSCH is identical to a TCI state or QCL assumption applied to a CORESET used for PDCCH transmission.

If the higher layer parameter tci-PresentInDCI is set to 'enabled', the TCI field in the DCI scheduling a component carrier (CC) points to activated TCI states in the scheduled CC or a DL BW, and the PDSCH is scheduled by DCI format 1_1, the UE uses a TCI-state according to the TCI field in the DCI in a detected PDCCH to determine PDSCH antenna port QCL. The UE may assume that DMRS ports of the PDSCH of a serving cell are QCLed with RS(s) in the TCI state with respect to QCL type parameter(s) given by an indicated TCI state if the time offset between reception of the DL DCI and reception of the corresponding PDSCH is equal to or greater than the threshold Threshold-Sched-Offset (where the threshold is determined based on reported UE capability). When the UE is configured with a single slot PDSCH, the indicated TCI state should be based on the activated TCI states in a slot with the scheduled PDSCH. When the UE is configured with CORESET associated with a search space set for cross-carrier scheduling, the UE expects that the higher layer parameter tci-PresentInDci is set to 'enabled' for the CORESET. If one or more of the TCI states configured for the serving cell scheduled by the search space set contains 'QCL-TypeD', the UE expects that the time offset between reception of the detected PDCCH in the search space set and reception of the corresponding PDSCH is greater than or equal to the threshold timeDuration-ForQCL.

For both the case in which a higher layer parameter tci-PresentInDCI is set to 'enabled' and the case in which the higher layer parameter tci-PresentInDCI is not configured in RRC connected mode, if the offset between reception of the DL DCI and reception of the corresponding PDSCH is less than the threshold Threshold-Sched-Offset, the UE makes the following assumptions. (i) DMRS ports of a PDSCH of a serving cell are QCLed with the RS(s) in a TCI state with respect to QCL parameter(s). (ii) In this case, the QCL parameter(s) are used for PDCCH QCL indication of the CORESET associated with a monitored search space with the lowest CORESET-ID in the latest slot in which one or more CORESETs within an active BWP of the serving cell are monitored by the UE.

In this case, if the 'QCL-TypeD' of a PDSCH DMRS is different from 'QCL-TypeD' of a PDCCH DMRS with which overlapping occurs in at least one symbol, the UE is expected to prioritize reception of the ePDCCH associated with the corresponding CORESET. This operation may also be applied to an intra-band carrier aggregation case (when the PDSCH and the CORESET are in different CCs). If none of configured TCI states contains 'QCL-TypeD', the UE obtains the other QCL assumptions from the indicated TCI states for a scheduled PDSCH irrespective of the time offset between reception of the DL DCI and reception of the corresponding PDSCH.

For a periodic CSI-RS resource in an NZP-CSI-RS-ResourceSet configured with a higher layer parameter trs-Info, the UE should assume that that a TCI state indicates one of the following QCL type(s):
  'QCL-TypeC' with an SS/PBCH block and, when (QCL-TypeD) is applicable, 'QCL-TypeD' with the same SS/PBCH block, or
  'QCL-TypeC' with an SS/PBCH block and, when (QCL-TypeD) is applicable, 'QCL-TypeD' with a periodic CSI-RS resource in a higher layer parameter NZPCSI-RS-ResourceSet configured with a higher layer parameter repetition.

For a CSI-RS resource in the higher layer parameter NZP-CSI-RS-ResourceSet configured with the higher layer parameter trs-Info and without the higher layer parameter repetition, the UE should assume that a TCI state indicates one of the following QCL type(s):
- 'QCL-TypeA' with a CSI-RS resource in the higher layer parameter NZP-CSI-RS-ResourceSet configured with a higher layer parameter trs-Info and, when (QCL-TypeD) is applicable, 'QCL-TypeD' with the same CSI-RS resource, or
- 'QCL-TypeA' with a CSI-RS resource in the higher layer parameter NZP-CSI-RS-ResourceSet configured with a higher layer parameter trs-Info and, when (QCL-TypeD) is applicable, 'QCL-TypeD' with an SS/PBCH, or
- 'QCL-TypeA' with a CSI-RS resource in the higher layer parameter NZP-CSI-RS-ResourceSet configured with the higher layer parameter trs-Info and, when (QCL-TyepD) is applicable, 'QCL-TypeD' with a periodic CSI-RS resource in the higher layer parameter NZP-CSI-RS-ResourceSet configured with the higher layer parameter repetition, or
- 'QCL-TypeB' with a CSI-RS resource in the higher layer parameter NZP-CSI-RS-ResourceSet configured with the higher layer parameter trs-Info when 'QCL-TypeD' is not applicable.

For a CSI-RS resource in the higher layer parameter NZP-CSI-RS-ResourceSet configured with the higher layer parameter repetition, the UE should assume that a TCI state indicates one of the following QCL type(s):
- 'QCL-TypeA' with a CSI-RS resource in the higher layer parameter NZP-CSI-RS-ResourceSet configured with the higher layer parameter trs-Info and, when ('QCL-TypeD) is applicable, 'QCL-TypeD' with the same CSI-RS resource, or
- 'QCL-TypeA' with a CSI-RS resource in the higher layer parameter NZP-CSI-RS-ResourceSet configured with the higher layer parameter trs-Info and, when ('QCL-TypeD' is) applicable, 'QCL-TypeD' with a CSI-RS resource in the higher layer parameter NZP-CSI-RS-ResourceSet configured with higher layer parameter repetition, or
- 'QCL-TypeC' with an SS/PBCH block and, when (QCL-TypeD) is applicable, 'QCL-TypeD' with the same SS/PBCH block.

For the DMRS of PDCCH, the UE should assume that a TCI state indicates one of the following QCL type(s):
- 'QCL-TypeA' with a CSI-RS resource in the higher layer parameter NZP-CSI-RS-ResourceSet configured with the higher layer parameter trs-Info and, when (QCL-TypeD) is applicable, 'QCL-TypeD' with the same CSI-RS resource, or
- 'QCL-TypeA' with a CSI-RS resource in the higher layer parameter NZP-CSI-RS-ResourceSet configured with a higher layer parameter trs-Info and, when (QCL-TypeD) is applicable, 'QCL-TypeD' with a CSI-RS resource in the higher layer parameter NZP-CSI-RS-ResourceSet configured with the higher layer parameter repetition, or
- 'QCL-TypeA' with a CSI-RS resource in the higher layer parameter NZP-CSI-RS-ResourceSet configured without the higher layer parameter trs-Info and without the higher layer parameter repetition and, when (QCL-TypeD) is applicable, 'QCL-TypeD' with the same CSI-RS resource.

For the DMRS of the PDSCH, the UE should assume that a TCI state indicates one of the following QCL type(s):
- 'QCL-TypeA' with a CSI-RS resource in the higher layer parameter NZP-CSI-RS-ResourceSet configured with the higher layer parameter trs-Info and, when (QCL-TypeD) is applicable, 'QCL-TypeD' with the same CSI-RS resource, or
- 'QCL-TypeA' with a CSI-RS resource in the higher layer parameter NZP-CSI-RS-ResourceSet configured with the higher layer parameter trs-Info and, when (QCL-TypeD) is applicable, 'QCL-TypeD' with a CSI-RS resource in the higher layer parameter NZP-CSI-RS-ResourceSet configured with the higher layer parameter repetition, or
- QCL-TypeA' with a CSI-RS resource in the higher layer parameter NZP-CSI-RS-ResourceSet configured without the higher layer parameter trs-Info and without the higher layer parameter repetition and, when (QCL-TypeD) is applicable, 'QCL-TypeD' with the same CSI-RS resource.

1.9. Beam Management

The gNB may make a request to the UE for periodic CSI/beam reporting, semi-persistent CSI/beam reporting (e.g., periodic CSI reporting is activated for only a specific time duration or the UE continuously performs CSI reporting a plurality of times), or aperiodic CSI/beam reporting.

In this case, CSI reporting information may include at least one of the following information.
- RI (rank indicator) representing information as to how many layer/streams the UE desires to simultaneously receive.
- PMI (precoder matrix indication) representing information as to which multiple input multiple output (MIMO) precoding the gNB desires to apply in terms of the UE.
- CQI (channel quality information) representing channel quality information considering strength of a signal desired by the UE and strength of an interference signal.
- CRI (CSI-RS resource indicator) representing a CSI-RS resource index preferred by the UE among a plurality of CSI-RS resources (to which different beamforming is applied).
- LI (layer indicator) representing an index of a layer having best quality in terms of the UE.

In addition, beam reporting information may be configured by a specific combination of the CRI indicating a preferred beam index when an RS for beam quality measurement is a CSI-RS, an SSB ID indicating a preferred beam index when the RS for beam quality measurement is an SSB, and reference signal received power (RSRP) indicating beam quality.

For periodic and semi-persistent (SP) CSI/beam reporting of the UE, the gNB may allocate a UL physical channel (e.g., a PUCCH or a PUSCH) for CSI/beam reporting to the UE at a specific period in a time duration during which the reporting has been activated. For CSI measurement of the UE, the gNB may transmit a DL RS to the UE.

In the case of a beamformed system to which (analog) beamforming has been applied, it is necessary to determine a DL transmission (Tx)/reception (Rx) beam pair for DL RS transmission/reception and a UL Tx/Rx beam pair for UCI (e.g., CSI or ACK/NACK) transmission/reception.

A DL beam pair determination process may include a combination of (i) a transmission and reception point (TRP) Tx beam selection procedure of transmitting, by the gNB, DL RSs corresponding to a plurality of TRP Tx beams to the UE and selecting and/or reporting, by the UE, one of the DL RSs, and (ii) a procedure of repeatedly transmitting, by the gNB, the same RS signal corresponding to each TRP Tx beam and measuring, by the UE, the repeatedly transmitted signals using different UE Rx beams and selecting a UE Rx beam.

A UL beam pair determination process may include a combination of (i) a UE Tx beam selection procedure of transmitting, by the UE, UL RSs corresponding to a plurality of UE Tx beams to the gNB and selecting and/or signaling, by the gNB, one of the UL RSs, and (ii) a procedure of repeatedly transmitting, by the UE, the same RS signal corresponding to each UE Tx beam to the base station and measuring, by the gNB, the repeatedly transmitted signals using different TRP Rx beams and selecting a TRP Rx beam.

When beam reciprocity (or beam correspondence) of DL/UL is established (e.g., when it may be assumed that a gNB DL Tx beam and a gNB UL Rx beam are identical and a UE UL Tx beam and a UE DL Rx beam are identical in communication between the gNB and the UE), if one of a DL beam pair and a UL beam pair is determined, a procedure of determining the other of the DL beam pair and the UL beam pair may be omitted.

The DL and/or UL beam pair determination process may be performed periodically or aperiodically. As an example, when there are many candidate beams, required RS overhead may increase. In this case, the DL and/or UL beam pair determination process may be performed at a predetermined period in consideration of RS overhead.

After the DL and/or UL beam pair determination process is completed, the UE may perform periodic or SP CSI reporting. A CSI-RS including a single antenna port or a plurality of antenna ports for CSI measurement of the UE may be beamformed and transmitted using a TRP Tx beam determined as a DL beam. In this case, the transmission period of the CSI-RS may be set to be equal to or shorter than the CSI reporting period of the UE.

Alternatively, the gNB may transmit an aperiodic CSI-RS at a CSI reporting period of the UE or more frequently than the CSI reporting period of the UE.

The UE may transmit measured CSI using the UL Tx beam determined in the periodic UL beam pair determination process.

1.10. Beam Recovery Procedure

In performing a DL/UL beam management process at the UE and the gNB, a beam mismatch problem may occur according to a set beam management period.

In particular, in the case in which a wireless channel environment is changed due to movement of position of the UE, rotation of the UE, or movement of a nearby object (e.g., a line of sight (LoS) environment is changed to a non-LoS environment as a beam is blocked), an optimal DL/UL beam pair may be changed. Such a change may be more generally explained as occurrence of a beam failure event due to failure of tracking of a beam management process performed by a network indication.

The UE may determine whether such a beam failure event has occurred through reception quality of a DL RS.

Next, the UE may transmit a report message for such a situation or a beam recovery request message (hereinafter referred to as a beam failure recovery request (BFRQ) message) to the gNB (or network).

The gNB may receive the message and perform beam recovery through various processes such as beam RS transmission and beam reporting request for beam recovery. This series of beam recovery processes is called beam failure recovery (BFR).

According to the standard specification, such as 3GPP TS 38.213 or 3GPP TS 38.321, a BFR procedure may be configured as follows.

(1) Beam Failure Detection (BFD)

When all PDCCH beams fall below a predetermined quality value $Q\_out$, a physical layer of the UE declares that one beam failure instance has occurred.

In this case, the quality of a beam is measured based on a hypothetical block error rate (BLER). In other words, the quality of the beam may be measured based on a probability that the UE fails to demodulate control information if it is assumed that the corresponding information has been transmitted on a corresponding PDCCH.

For implicit configuration for a BFD RS, a plurality of search spaces for monitoring the PDCCH may be configured for a specific UE. Beams (or resources) may be configured to be different for respective search spaces. Therefore, the case in which all PDCCH beams fall below a predetermined quality value may mean the case in which the quality of all the beams falls below a BLER threshold.

For the BFD RS, various configuration methods may be applied/configured.

As an example, an implicit configuration method may be used for the BFD RS. More specifically, each search space may be configured with a CORESET (refer to TS 38.213, TS 38.214, or TS 38.331) ID, which is a resource region in which the PDCCH may be transmitted. The gNB may indicate/configure QCLed RS information (e.g., a CSI-RS resource ID or an SSB ID) in terms of a spatial Rx parameter for each CORESET ID for/to the UE. For example, the gNB may indicate/configure an QCLed RS to/for the UE through an indication of TCI.

Here, indication/configuration of the QCLed RS in terms of the spatial Rx parameter (i.e., QCL type D in TS 28.214) by the gNB to/for the UE may mean that the UE should use (or may use) a beam which has been used for reception of a spatially QCLed RS to receive a corresponding PDCCH DMRS. In other words, indication/configuration of the QCLed RS in terms of the spatial Rx parameter (i.e., QCL type D in TS 28.214) by the gNB to/for the UE may mean that, in terms of the gNB, the gNB notifies the UE that transmission will be performed by applying the same Tx beam or similar Tx beams (e.g., the case in which beam widths are different while beam directions are the same/similar) to spatially QCLed antenna ports.

For explicit configuration of the BFD RS, the gNB may explicitly configure specific RSs (e.g., beam RS(s)) for the purpose of BFD for the UE. In this case, the specific RSs may correspond to the "all PDCCH beams".

Hereinafter, for convenience of description, a plurality of BFD RSs will be defined as a BFD RS set.

When a beam failure instance occurs a predetermined number of times (in succession), a media access control (MAC) layer of the UE may declare that beam failure has occurred.

(2) New Beam Identification and Selection (2-1) Step 1

The UE may search for a beam having a determined quality value ($Q\_in$) or higher among RSs configured by the gNB as a candidate beam RS set.

If one beam RS exceeds the determined quality value (threshold), the UE may select the corresponding beam RS.

If a plurality of beam RSs exceeds the threshold, the UE may select one of the corresponding beam RSs.

If there is no beam exceeding the threshold, the UE may perform Step 2 below.

In the above-described operation, the beam quality may be determined based on an RSRP.

In the present disclosure, the RS beam set configured by the gNB may be configured as one of three cases below.

All beam RSs in the RS beam set are composed of SSBs.

All beam RSs in the RS beam set are composed of CSI-RS resources.

Beam RSs in the RS beam set are composed of SSBs and CSI-RS resources.

(2-2) Step 2

The UE may search for a beam having the determined threshold Q_in or higher among SSBs (connected to a contention-based PRACH resource).

If one SSB exceeds the threshold, the UE may select the corresponding SSB.

If a plurality of SSBs exceeds the threshold, the UE may select one of the SSBs.

If there is no SSB exceeding the threshold, the UE may perform step 3 below.

(2-3) Step 3

The UE may select any SSB among the SSBs (connected to the contention-based PRACH resource).

(3) Contention-Free Random Access (CFRA)-Based BFRQ and Monitoring of Response of GNB In the present disclosure, a BFRQ may include transmitting, by the UE, a PRACH resource and a PRACH preamble configured to be directly or indirectly connected to the beam RS (CSI-RS or SSB) selected in the above-described process to the gNB. In other words, the BFRQ may include transmitting, by the UE, the PRACH preamble related to the beam RS selected in the above-described process through the PRACH resource related to the beam RS selected by the UE.

In the present disclosure, the PRACH resource and the PRACH preamble configured to be directly connected may be used in the following two cases.

The case in which a contention-free PRACH resource and PRACH preamble are configured for a specific RS in a candidate beam RS set separately configured for BFR.

The case in which a (contention-based) PRACH resource and PRACH preamble mapped respectively to SSBs configured for general purposes, such as random access, are configured.

Alternatively, the PRACH resource and the PRACH preamble configured to be indirectly connected may be used in the following cases.

The case in which the contention-free PRACH resource and preamble are not configured for a specific CSI-RS in a candidate beam RS set separately configured for BFR.

In this case, the UE may select a (contention-free) PRACH resource and PRACH preamble connected to an SSB designated as being capable of being received by the same Rx beam as a corresponding CSI-RS (i.e., QCLed with respect to a spatial Rx parameter).

For convenience of description, reference signal received quality (RSRQ) based on the contention-free PRACH resource and PRACH is referred to as CFRA-based RSRQ.

The UE may transmit a PRACH preamble to the gNB based on the above-described configuration and monitor a response of the gNB to corresponding PRACH transmission.

Here, a response to the contention-free PRACH resource and PRACH preamble may be transmitted on a PDCCH masked with a cell random access network temporary identifier (C-RNTI). The PDCCH may be received in a search space separately configured (by RRC signaling) for BFR.

The search space may be configured on a specific CORESET (for BFR).

In the present disclosure, a response to a contention-based PRACH for BFR may reuse a CORESET (e.g., CORESET 0 or CORESET 1) and a search space, configured for a random access procedure based on a contention-based PRACH.

If there is no reply for a certain time in the above-described configuration, the UE may repeatedly perform the new beam identification and selection process and the BFRQ and monitoring process of the response of the gNB.

In the present disclosure, the UE may perform the above processes until (i) PRACH transmission reaches a predetermined maximum number (e.g., N_max) or (ii) a separately set timer expires. When the timer expires, the UE may stop contention-free-based PRACH transmission. However, the UE may perform transmission of the contention-based PRACH based on SSB selection until PRACH transmission reaches N_max (regardless of whether the timer expires).

(4) Contention-Based Random Access (CBRA)-Based BFRQ and Monitoring of Response of GNB In the following cases, the UE may perform a CBRA-based BFRQ.

The case in which the UE fails to perform a CFRA-based BFRQ. In this case, the UE may perform the CBRA-based BFRQ as a subsequent operation.

The case in which CFRA is not defined in an active BWP.

The case in which a CORESET associated with a higher layer parameter SearchSpace-BFR is not configured or the higher layer parameter SearchSpace-BFR is not configured.

However, unlike the case of CFRA, the UE may use, for CBRA, a PRACH resource used during UL initial access and then may collide with other UEs.

The above-described beam failure detection and beam recovery procedures may be summarized as follows.

When beam failure is detected on serving SSB(s)/CSI-RS(s), a MAC entity may be configured by RRC signaling with a beam failure recovery procedure which is used to indicate a new SSB or CSI-RS to a serving gNB. Beam failure may be detected by counting a beam failure instance indication from lower layers to the MAC entity. For the beam failure detection and recovery procedure, the gNB may configure the following parameters in a higher layer parameter BeamFailureRecoveryConfig for the UE by RRC signaling:

beamFailureInstanceMaxCount (for beam failure detection);

beamFailureDetectionTimer (for beam failure detection);

beamFailureRecoveryTimer (for the beam failure recovery procedure);

rsrp-ThresholdSSB: an RSRP threshold for beam failure recovery;

powerRampingStep: a parameter powerRampingStep for beam failure recovery;

preambleReceivedTargetPower: a parameter preambleReceivedTargetPower for beam failure recovery;

preambleTransMax: parameter preambleTransMax for beam failure recovery;

ra-ResponseWindow: a time window to monitor response(s) for the beam failure recovery procedure using a contention-free random access preamble;

prach-ConfigIndex: a parameter prach-ConfigIndex for beam failure recovery;

ra-ssb-OccasionMaskIndex: a parameter ra-ssb-OccasionMaskIndex for beam failure recovery;

ra-OccasionList: a parameter ra-OccasionList for beam failure recovery;

The UE may use the following variable for the beam failure detection procedure:
  BFI_COUNTER: a counter for a beam failure instance indication which is initially set to 0.
The MAC entity of the UE may operate as follows.
1> if the beam failure instance indication is received from lower layers:
  2> start or restart beamFailureDetectionTimer;
  2> increment BFI_COUNTER by 1;
  2> if BFI_COUNTER>=beamFailureInstanceMaxCount:
    3> if a higher layer parameter beamFailureRecoveryConfig is configured:
      4> start beamFailureRecoveryTimer (if configured);
      4> initiate a random access procedure on a special cell (SpCell) (e.g., a PCell in a macro cell group (MCG) or a primary secondary cell group cell (PSCell) in a secondary cell group (SCG)) by applying parameters powerRampingStep, preambleReceivedTargetPower, and preambleTransMax configured in the higher layer parameter beamFailureRecoveryConfig;
    3> or:
      4> initiate a random access procedure on an SpCell.
1> if beamFailureDetectionTimer expires:
  2> set BFI_COUNTER to 0.
1> if the random access procedure is successfully completed:
  2> stop beamFailureRecoveryTimer (if configured).
  2> consider the beam failure recovery procedure as being successfully completed.

Additionally, the PCell, the SCell, and the serving cell may be defined as follows.

[1] Primary Cell (PCell)

A PCell refers to a cell operating on a primary frequency which is used by the UE to perform an initial connection establishment procedure or a connection re-establishment procedure or is indicated as the PCell in a handover procedure.

[2] Secondary Cell (SCell)

An SCell refers to a cell operating on a secondary frequency which is configurable after RRC connection setup or usable to provide an additional radio resource such as an additional carrier for carrier aggregation.

In the present disclosure, contention-based random access (CBRA) may not be configured on the SCell, whereas contention-free random access (CFRA) may be performed to be configured on the SCell.

[3] Serving Cell

For the UE in an RRC CONNECTED state, for which CA is not configured, only one serving cell including the PCell is present. For the UE in an RRC CONNECTED state, for which CA is configured, serving cells mean one or more sets including one PCell and all SCell(s).

1.11. Random Access Channel (RACH)

Hereinbelow, a random access procedure and an RACH applicable to the present disclosure will be described.

Figure 8:
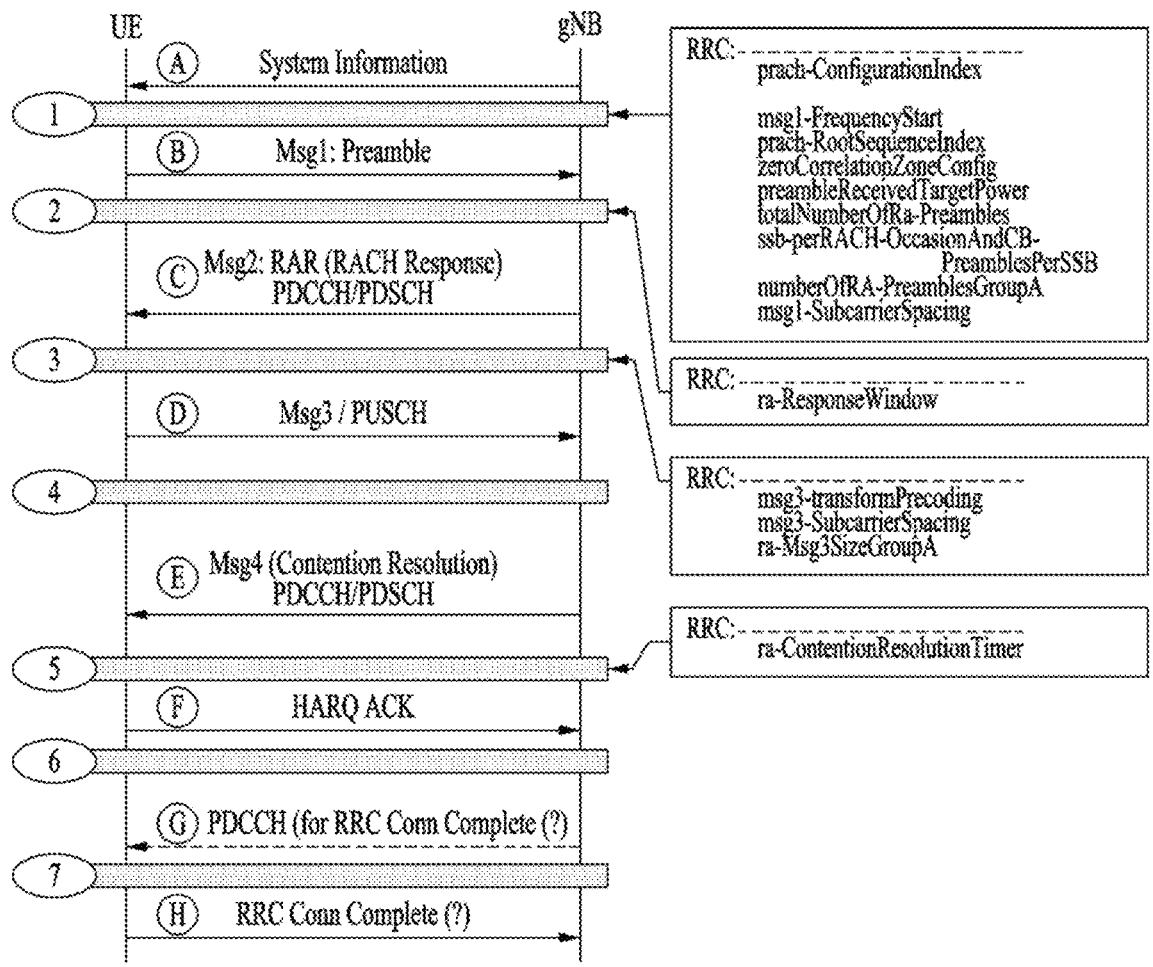
FIG. 8 is a diagram schematically illustrating a random access procedure applicable to the present disclosure.

FIG. 8 is a diagram schematically illustrating a random access procedure applicable to the present disclosure.

In steps (A) and (1) in FIG. 8, the UE may receive system information (for initial attachment) or RRC connection reconfiguration information (for LTE interplay) from the gNB.

In step (B) in FIG. 8, the UE may transmit Msg1 (a PRACH preamble) to the gNB. In this step, if all conditions for PRACH transmission are met, the UE may transmit the PRACH preamble masked (or scrambled) with an RA-RNTI to the gNB.

In steps (2) and (C) in FIG. 8, the UE may receive Msg 2 (e.g., a random access response (RAR) (on a PDCCH/PDSCH). In these steps (i.e., after PRACH transmission), the following procedures may be performed.
  The gNB transmits DCI scrambled with the (above-calculated) RA-RNTI to the gNB.
  The UE may attempt to detect the PDCCH (e.g., DCI) masked (or scrambled) with the corresponding RA-RNTI in the period of an RAR-window. For example, within ra-ResponseWindow, the UE may look for the DCI in a search space (e.g., Type 1 PDCCH common search space).
  A DCI format for scheduling the RAR PDSCH may use DCI format 1_0 masked (or scrambled) with the RA-RNTI.

In steps (3) and (D) in FIG. 8, the UE may transmit Msg3 (on the PUSCH) to the gNB. In these steps (i.e., immediately before Msg3 is transmitted), the following procedures may be performed.
  The UE should determine whether to apply transform precoding for the Msg3 PUSCH, based on a higher layer parameter msg3-transformPrecoding called msg3-tp.
  The UE should determine an SCS for the Msg3 PUSCH from a higher layer parameter Subcarrier Spacing called msg3-scs.
  The UE should transmit the Msg3 PUSCH on the same serving call in which a PRACH has been transmitted In steps (4) and (E) in FIG. 8, the UE may receive Msg4 (e.g., contention resolution) (on the PDCCH/PDSCH) from the gNB. In these steps (i.e., immediately after Msg3 is transmitted), the following procedures may be performed. For convenience of description, only successful cases will be described below.
  Start ra-ContentionResolutionTimer
  Perform monitoring to decode the PDCCH masked (or scrambled) with a temporary C-RNTI (TC-RNTI). In other words, the UE looks for DCI in a search space (e.g., Type 1 PDCCH common search space) while ra-ContentionResolutionTimer is running.
  If the PDCCH is successfully decoded,
    the UE decodes the PDSCH carrying a MAC control element (CE)
    set C-RNTI=TC-RNTI
  Discard ra-ContentionResolutionTimer
  Consider that this random access procedure successfully completed In steps (5) and (F) in FIG. 8, the UE may transmit a HARQ ACK signal for Msg4 to the gNB. Once the UE successfully decodes Msg4 (contention resolution), the UE may transmit HARQ ACK for data (e.g., PDSCH carrying Msg4).

2. Operation Examples of UE and gNB Proposed in Present Disclosure

Prior to description of the present disclosure, terms used to describe the present disclosure are defined as follows.

In the following description, q0 refers to an RS set for beam failure detection. In the present disclosure, q0 may be provided by a higher layer parameter failureDetectionResources. q1 refers to a candidate beam RS set. In the present disclosure, q1 may be provided by a higher layer parameter candidateBeamRSList.

In the following description, a PRACH resource refers to an RACH occasion (RO) and/or an RACH preamble.

As described earlier, the following abbreviations may be defined as follows.

BFR: Beam Failure Recovery
BFD: Beam Failure Detection
BFRQ: Beam Failure Recovery ReQuest
CFRA: Contention Free Random Access
CBRA: Contention Based Random Access As described earlier, when the UE declares BFD in an SCell, if a CFRA PRACH resource configured in the SCell is present, the UE may transmit a corresponding CFRA-based PRACH to the gNB. Next, if a CFRA-based BFRQ fails, the UE may transmit, for BFR, a CBRA-based PRACH (or a CFRA-based PRACH or PUCCH) (configured for BFR) to a PCell (rather than the SCell). This is because the CBRA-based PRACH is defined only for the PCell and is not defined for the SCell as described above. In addition, even when UL transmission fails on the SCell, since frequencies (and beams) differ between serving cells, there is a possibility that UL transmission on the PCell will be successful. In this case, the UE may select a preferred SSB from among SSBs of the UE and transmit a PRACH resource associated with the preferred SSB.

In the above-described configuration, if beam failure has occurred, this may imply that a UL beam of the UE may still not be valid. To solve this issue (e.g., to correct a PUCCH beam direction of the PCell after BFR) for the PCell, one or both of the following two alternatives may be applied.

(1) Alt 1

After K symbols from the time when a response to BFR is successfully received from the gNB, the UE may use, for PUCCH transmission, the same spatial filter as a spatial filter used for PRACH transmission until activation or reconfiguration for PUCCH-Spatial-relation-info of at least one configured PUCCH resource is received.

In this case, latency for receiving/interpreting RRC configuration or MAC CE configuration may be included in a part of a time duration to which the same spatial filter as the spatial filter used for PRACH transmission is applied. Here, the K value may be set in various ways, such as using a fixed value or following a value set by the gNB.

(2) Alt 2

After K symbols from the time when a response to BFR is successfully received from the gNB, the UE may (limitedly) use the same spatial filter as a spatial filter used for PRACH transmission, for PUCCH transmission for HARQ-ACK/NACK transmission of a DL PDSCH scheduled from Search-Space-BFR, until activation or reconfiguration for PUCCH-Spatial-relation-info of at least one configured PUCCH resource is received.

In this case, latency for receiving/interpreting RRC configuration or MAC CE configuration may be included in a part of a time duration to which the same spatial filter as the spatial filter used for PRACH transmission is applied. Here, the K value may be set in various ways, such as using a fixed value or following a value set by the gNB.

According to the above methods, the UE may receive a response signal of the gNB in a search space for BFR provided by a higher layer parameter (e.g., recovoerySearchSpaceId). After the K symbols from reception of the response signal, the UE may correct the PUCCH resource (e.g., a beam or a spatial Rx/Tx parameter) based on the above methods.

In this process, when a beam recovery procedure based on a CFRA-based BFRQ for beam failure on the SCell is successful, the UE may solve beam failure for the SCell (e.g., a PUCCH resource (e.g., beam direction) problem) using the above-described methods.

As described above, in the beam failure recovery procedure, when a specific case occurs (e.g., various cases such as failure of a CFRA-based BFRQ or non-definition of CFRA in an active BWP may be considered. For details, see the fourth paragraph in clause 1.10), the UE should perform a CBRA-based BFRQ for the PCell.

However, in this case, if BFR (i.e., BFR based on the CBRA-based BFRQ for the PCell) is successful, the PUCCH resource (e.g., PUCCH beam direction, etc.) of the SCell determined by the successful BFR may have the following problems.

When carrier frequencies used by the PCell and the SCell are different, it may be difficult for the UE to use a PRACH resource (e.g., a Tx filter of a beam direction) selected in the PCell as a PUCCH resource (e.g., a Tx filter of the beam direction) of the SCell. This is because a separation distance between antennas may be different due to different carrier frequencies used in the respective cells and thus Tx filter coefficients are inevitably different. In addition, since the shape and number of Tx beams of the UE operated by the UE in the PCell and the SCell may all be different, it may be difficult for the UE to use the PRACH resource determined from the PCell as the PUCCH resource of the SCell.

Figure 9:
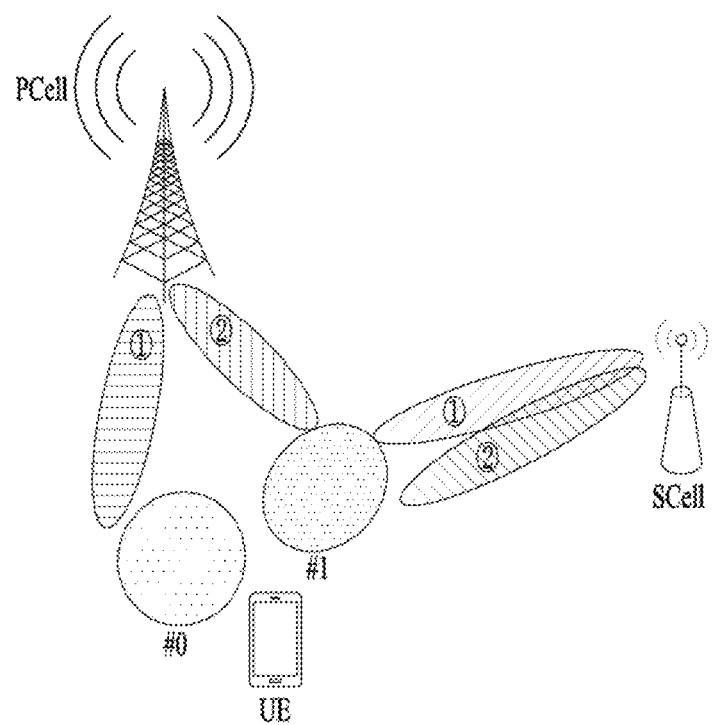
FIG. 9 is a diagram schematically illustrating a connection relationship between a UE, a PCell, and an SCell according to the present disclosure.

Further, a beam connection relationship between the UE, the PCell, and SCell may have the following problems. FIG. 9 is a diagram schematically illustrating a connection relationship between the UE, the PCell, and the SCell according to the present disclosure. As illustrated in FIG. 9, there may be a connection relationship between the PCell, the SCell, and beams. More specifically, the UE may include two or more RF modules (e.g., RF filters, etc.), RF module #0 and RF module #1. Two beams may be configured between the UE and the PCell, and the beams may be transmitted through RF module #0 and RF module #1. On the other hand, two beams configured between the UE and the SCell may be configured to be transmitted through only the RF module #1 of the UE. In this case, when the UE performs a CBRA-based BFRQ through beam 1 of the PCell and configures a PUCCH resource (e.g., beam direction) for the SCell based on beam direction 1 of the PCell, it may be difficult for the UE to correctly transmit a PUCCH to the SCell.

As a method for solving such a problem, the present disclosure proposes the following methods.

2.1. First Operation Example

For BFR for the SCell, the UE may perform the CBRA-based BFRQ on the PCell. If the UE succeeds in performing BFR using a PRACH resource associated with an RS (e.g., a CSI-RS or an SSB) of the PCell having a spatial QCL relation with an RS (e.g., the CSI-RS or the SSB) belonging to an SCell candidate beam RS set (e.g., q1), the UE may correct an existing SCell PUCCH resource (e.g., beam) after K2 symbols (starting from the time when the UE receives a response signal from the gNB) using one of the following methods.

Update a spatial filter of an SCell PUCCH beam to a spatial filter of a PRACH Tx beam on which BFR is successful.

Update spatial_relation_info related to the SCell PUCCH beam to a PRACH Tx beam on which the UE has succeeded in performing BFR or an SSB resource ID or a CSI-RS resource ID, which is a new beam RS corresponding to the PRACH.

In this case, the updated spatial filter or spatial_relation_info may be valid up to a specific timing. As an example, one of the following timings may be used as the specific timing.

a temporary ending timing or a timing after a predetermined time duration a timing at which the UE transmits ACK (rather than NACK) to the gNB a timing at which the UE receives beam reconfiguration or a beam switching indication for a corresponding PUCCH resource from the gNB In the above-described example, the K2 value may be set to a value corresponding to a time required for the UE to change an existing PUCCH resource (e.g., beam direction) to a PRACH resource (e.g., beam direction) (determined according to BFR success) (after BFR success of the UE). The K2 value may be determined based on implementation of the UE. For example, the K2 value may be determined based on information reported according to UE capability or may be configured by the gNB based on the reporting value. As another example, the K2 value may be configured/determined by the 3GPP standard specification (e.g., 3GPP TS 38.331). As still another example, the K2 value may be determined based on a configured numerology. More specifically, the length of OFDM symbols is shorter as an SCS increases. Therefore, the K2 value may also increase as the SCS value increases.

As illustrated in FIG. 9, it is assumed that beam 2 (e.g., SSB) of the PCell is configured as special QCL sources of beam 1 and beam 2 (e.g., CSI-RS) of the SCell. If the UE succeeds in performing BFR through a PRACH resource connected to beam 2 of the PCell, the UE may update spatial_relation_info of an SCell PUCCH beam to a PRACH Tx beam on which BFR is successful or an SSB resource ID corresponding to the PRACH.

As another example of the above-described operation, the gNB may configure an additional RS set, instead of the SCell candidate beam RS set (e.g., q1), for the UE. Then, the UE may update the existing SCell PUCCH resource (e.g., beam) based on the additional RS set.

In the present disclosure, RSs included in q1 may correspond to SCell CFRA-based PRACH resources, respectively. Meanwhile, for a CBRA BFRQ, the UE may use the SCell candidate beam RS set to search for an RS of the PCell having a spatial QCL relation with an RS of the SCell, which may be different from a substantial purpose of the RSs included in q1.

Particularly, when the number of UL beams supported in the CFRA-based BFRQ of the SCell is smaller than the number of SCell PUCCH beams, q1 may not include SCell beam RSs (e.g., CSI-RS and SSB) corresponding to partial PUCCH beams. As an example, when partial PRACH resources (e.g., beam direction) for the PCell are equal to PUCCH resources (e.g., beam direction) for the SCell but the SCell CFRA-based BFRQ is not supported on the SCell PUCCH resource (e.g., beam direction) (e.g., q1 does not include an unsupported SCell PUCCH resource and an SCell beam RS corresponding thereto), the gNB may configure an additional RS set, instead of an SCell candidate beam RS set (e.g., q1), for the UE. The UE may update the existing SCell PUCCH resource (e.g., beam) based on the additional RS set.

2.2. Second Operation Example

For BFR for the SCell, the UE may perform the CBRA-based BFRQ on the PCell. If the UE succeeds in performing BFR using a PRACH resource related to RSs (e.g., CSI-RS and SSB) of the PCell having no spatial QCL relation with RSs (e.g., CSI-RS and SSB) belonging to the SCell candidate beam RS set (e.g., q1), the UE may maintain the existing SCell PUCCH resource (e.g., beam). Then, the UE may report specific information to the PCell through Msg3 and expect that spatial_relation_info of an SCell PUCCH resource (e.g., beam) will be reconfigured. In this case, the specific information may include at least one of the following information.

SCell ID

Information as to whether SCell beam failure has occurred or not

Information about an SCell beam RS preferred by the UE

As an example, the UE may perform the BFRQ using a PRACH resource associated with an RS of the PCell having no spatial QCL relation with an RS included in the SCell candidate beam RS set. Next, to solve the above-described problem, the UE may maintain the SCell PUCCH resource (e.g., beam direction) without newly updating the same. Then, the UE may report information about an SCell beam RS preferred thereby to the PCell through Msg3. In this case, the beam direction of Msg3 that the UE has transmitted may be configured to be equal to a PRACH Tx beam direction. Next, the UE may expect that spatial_relation_info of the SCell PUCCH beam will be reconfigured through Msg 4.

2.3. Third Operation Example

For BFR for the SCell, the UE may perform the CBRA-based BFRQ on the PCell. If only partial RSs among RSs of the PCell have a spatial QCL relation with RSs belonging to the SCell candidate beam RS set (e.g., q1) and the remaining RSs have no spatial QCL relation with the RSs belonging to the SCell candidate beam RS set, the UE may perform the (CBRA-based) BFRQ (on the PCell) preferentially using a PRACH resource having a spatial QCL relation with the RS of the PCell. Then, the UE may perform the BFRQ using a PRACH resource having no spatial QCL relation with the RS of the PCell.

According to the above-described first operation example, the UE may change the SCell PUCCH resource (e.g., beam direction) after K2 symbols from the time when BFR is successful based on a PRACH resource (e.g., beam direction) on which the UE has succeeded in performing BFR.

On the other hand, according to the above-described second operation example, the UE may report the SCell beam RS preferred by the UE to the gNB through Msg3 and then expect that spatial_relation_info of the PUCCH beam of the SCell will be reconfigured through Msg4.

Consequently, the second operation example requires much more delay and signaling to correct the existing SCell PUCCH resource (e.g., beam direction) relative to the first operation example. Accordingly, the third operation example proposes a method of preferentially performing the first operation example in order to minimize the above problem.

2.4. Fourth Operation Example

According to the fourth operation example, when the UE does not report the SCell beam RS preferred thereby to the PCell through Msg3 according to the above second operation example, the UE may update spatial_relation_info of the SCell PUCCH beam to a PRACH Tx beam on which BFR is successful or an SSB resource ID corresponding to the PRACH.

According to the above-described first operation example, the gNB may be indirectly aware of spatial_relation_info of the SCell PUCCH resource (e.g., beam) of the UE after success of BFR of the UE, based on whether there is a spatial QCL relation between the RS of the PCell (e.g., SSB) corresponding to a PRACH resource transmitted by the UE for a BFRQ and an RS belonging to the SCell candidate beam RS set.

On the other hand, although the UE has succeeded in performing BFR using a PRACH satisfying a spatial QCL relation, the UE may need to differently configure spatial-relation-info of the SCell PUCCH resource (e.g., beam) from the PRACH resource (e.g., Tx beam). In this case, the UE may report the SCell beam RS preferred thereby to the gNB (e.g., PCell) through Msg3.

When the UE omits SCell beam RS reporting, the gNB may determine that the UE does not need to differently configure spatial-relation-info of the SCell PUCCH resource (e.g., beam) from the PRACH resource (e.g., Tx beam). Then, the gNB may consider/expect that the UE will update spatial_relation_info of the SCell PUCCH resource (e.g., beam) to a PRACH Tx beam on which BFR is successful or an SSB resource ID corresponding to the PRACH resource (e.g., Tx beam).

Figure 10:
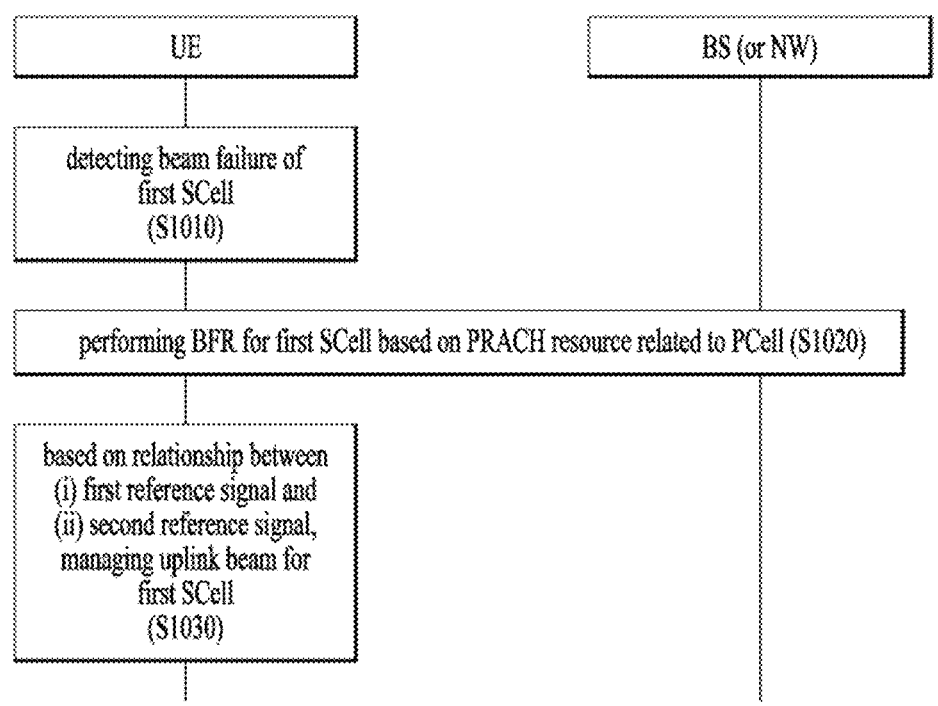
FIG. 10 is a diagram schematically illustrating an operation example of a UE and a gNB (or a network) according to the present disclosure.

FIG. 10 is a diagram schematically illustrating an operation example of a UE and a gNB (or a network) according to the present disclosure.

In FIG. 10, it is assumed that the UE has established connection with the gNB (or network) based on one PCell and one or more SCells.

In this case, the UE may detect occurrence of beam failure of a specific SCell (e.g., a first SCell) among the one or more SCells (S1010).

To detect occurrence of beam failure of the first SCell, the UE may perform various operations.

As an example, detection of occurrence of beam failure of the first SCell by the UE may include the following operations.

A physical layer of the UE declares one beam failure instance based on the quality of all PDCCH signals related to the first SCell, which is less than a predetermined threshold.

A MAC layer of the UE declares beam failure based on occurrence of the beam failure instance by a preset number of times.

The UE may perform BFR for the first SCell on the PCell using a PRACH resource related to the PCell, based on detection of beam failure of the first SCell (S1020).

In the present disclosure, the PRACH resource used for BFR for the first SCell may (i) have a correlation relation with an RS related to the PCell and (ii) correspond to a PRACH resource for CBRA.

Next, the UE may manage a UL beam of the first SCell using one of the following operations, based on the relationship between a first RS associated with a PRACH resource on which BFR is successful and a second RS included in an RS set related to the first SCell (S1030):

(i) Change the UL beam of the first SCell based on the PRACH resource on which BFR is successful (ii) Maintain the UL beam of the first SCell To this end, the RS set related to the first SCell may be configured by higher-layer signaling (e.g., RRC signaling) received from the gNB.

More specifically, the UE according to the present disclosure may operate as follows.

As an example, when the first RS has a spatial QCL relation with any one second RS included in the RS set related to the first SCell, the UE may change the UL beam of the first SCell based on the PRACH resource on which BFR is successful.

In this case, when the first RS has a spatial QCL relation with any one second RS included in the RS set related to the first SCell, the UE may change the UL beam of the first RS based on the PRACH resource on which BFR is successful, after a predetermined number of symbols from the time when the UE receives an RAR from the gNB.

As another example, when the first RS has no spatial QCL relation with all second RSs included in the RS set related to the first SCell, the UE may maintain the UL beam of the first SCell.

In this case, the UE may additionally perform the following operations:

As a response to the RAR, the UE transmits, to the gNB, a first signal including at least one of (i) ID information of the first SCell, (ii) information indicating that beam failure of the first SCell has occurred, and (iii) beam information related to the first SCell preferred by the UE.

The UE expects that the UL beam of the first SCell will be reconfigured through a second signal which is a response to the first signal.

In the above-described configurations, the UL beam of the first SCell may correspond to a PUCCH of the first SCell.

In the above-described configurations, the RS may include both (i) an SS/PBCH block (or SSB) and (ii) a CSI-RS.

Since examples of the above-described proposed methods may be included in one of implementation methods of the present disclosure, it is obvious that the examples may be regarded as proposed methods. Although the above-described proposed methods may be independently implemented, the proposed methods may be implemented in a combined (added) form of parts of the proposed methods. A rule may be defined such that information as to whether the proposed methods are applied (or information about rules of the proposed methods) is indicated by the eNB to the UE or by the transmission UE to the reception UE through a predefined signal (e.g., a physical layer signal or a higher-layer signal).

3. Example of Communication System to which Present Disclosure is Applied

The various descriptions, functions, procedures, proposals, methods, and/or operation flowcharts of the present disclosure described herein may be applied to, but not limited to, various fields requiring wireless communication/connectivity (e.g., 5G) between devices.

More specific examples will be described below with reference to the drawings. In the following drawings/description, like reference numerals denote the same or corresponding hardware blocks, software blocks, or function blocks, unless otherwise specified.

Figure 11:
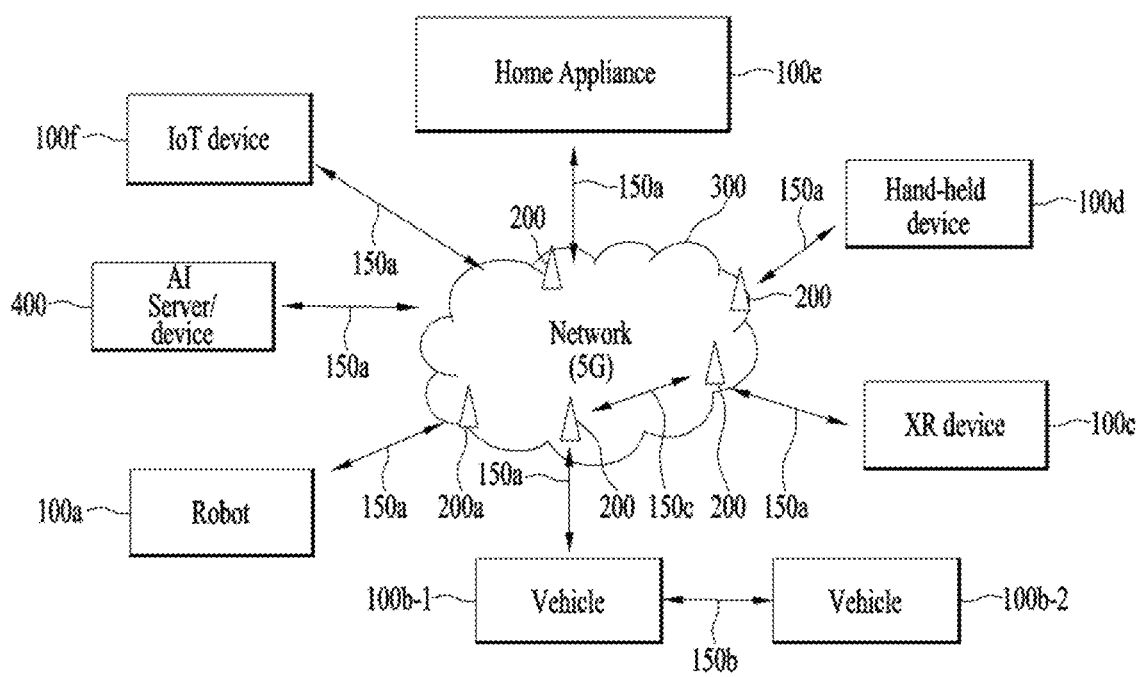
FIG. 11 illustrates a communication system applied to the present disclosure.

FIG. 11 illustrates a communication system 1 applied to the present disclosure.

Referring to FIG. 11, the communication system 1 applied to the present disclosure includes wireless devices, BSs, and a network. A wireless device is a device performing communication using radio access technology (RAT) (e.g., 5G NR (or New RAT) or LTE), also referred to as a communication/radio/5G device. The wireless devices may include, not limited to, a robot 100a, vehicles 100b-1 and 100b-2, an extended reality (XR) device 100c, a hand-held device 100d, a home appliance 100e, an IoT device 100f, and an artificial intelligence (AI) device/server 400. For example, the vehicles may include a vehicle having a wireless communication function, an autonomous driving vehicle, and a vehicle capable of vehicle-to-vehicle (V2V) communication. Herein, the vehicles may include an unmanned aerial vehicle (UAV) (e.g., a drone). The XR device may include an augmented reality (AR)/virtual reality (VR)/mixed reality (MR) device and may be implemented in the form of a head-mounted device (HMD), a head-up display (HUD) mounted in a vehicle, a television (TV), a smartphone, a computer, a wearable device, a home appliance, a digital signage, a vehicle, a robot, and so on. The hand-held device may include a smartphone, a smart pad, a wearable device (e.g., a smart watch or smart glasses), and a computer (e.g., a laptop). The home appliance may include a TV, a refrigerator, a washing machine, and so on. The IoT device may include a sensor, a smart meter, and so on. For example, the BSs and the network may be implemented as wireless devices, and a specific wireless device 200a may operate as a BS/network node for other wireless devices.

The wireless devices 100a to 100f may be connected to the network 300 via the BSs 200. An AI technology may be applied to the wireless devices 100a to 100f, and the wireless devices 100a to 100f may be connected to the AI server 400 via the network 300. The network 300 may be configured using a 3G network, a 4G (e.g., LTE) network, or a 5G (e.g., NR) network. Although the wireless devices 100a to 100f may communicate with each other through the BSs 200/network 300, the wireless devices 100a to 100f may perform direct communication (e.g., sidelink communication) with each other without intervention of the BSs/network. For example, the vehicles 100b-1 and 100b-2 may perform direct communication (e.g. V2V/vehicle-to-everything (V2X) communication). The IoT device (e.g., a sensor) may perform direct communication with other IoT devices (e.g., sensors) or other wireless devices 100a to 100f.

Wireless communication/connections 150a, 150b, and 150c may be established between the wireless devices 100a to 100f/BS 200 and between the BSs 200. Herein, the wireless communication/connections may be established through various RATs (e.g., 5G NR) such as UL/DL communication 150a, sidelink communication 150b (or, D2D communication), or inter-BS communication (e.g. relay or integrated access backhaul (IAB)). Wireless signals may be transmitted and received between the wireless devices, between the wireless devices and the BSs, and between the BSs through the wireless communication/connections 150a, 150b, and 150c. For example, signals may be transmitted and receive don various physical channels through the wireless communication/connections 150a, 150b and 150c. To this end, at least a part of various configuration information configuring processes, various signal processing processes (e.g., channel encoding/decoding, modulation/demodulation, and resource mapping/demapping), and resource allocation processes, for transmitting/receiving wireless signals, may be performed based on the various proposals of the present disclosure.

4. Example of Wireless Device to which Present Disclosure is Applied

Figure 12:
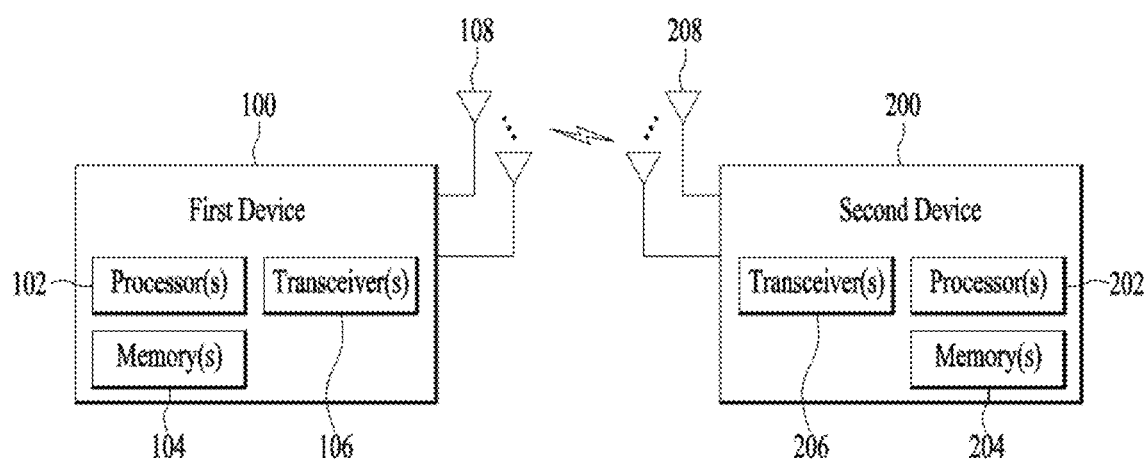
FIG. 12 illustrates wireless devices applicable to the present disclosure.

FIG. 12 illustrates wireless devices applicable to the present disclosure.

Referring to FIG. 12, a first wireless device 100 and a second wireless device 200 may transmit wireless signals through a variety of RATs (e.g., LTE and NR). {The first wireless device 100 and the second wireless device 200} may correspond to {the wireless device 100x and the BS 200} and/or {the wireless device 100x and the wireless device 100x} of FIG. 20.

The first wireless device 100 may include one or more processors 102 and one or more memories 104, and further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operation flowcharts disclosed in this document. For example, the processor(s) 102 may process information in the memory(s) 104 to generate first information/signals and then transmit wireless signals including the first information/signals through the transceiver(s) 106. The processor(s) 102 may receive wireless signals including second information/signals through the transceiver(s) 106 and then store information obtained by processing the second information/signals in the memory(s) 104. The memory(s) 104 may be connected to the processor(s) 102 and may store various pieces of information related to operations of the processor(s) 102. For example, the memory(s) 104 may store software code including instructions for performing all or a part of processes controlled by the processor(s) 102 or for performing the descriptions, functions, procedures, proposals, methods, and/or operation flowcharts disclosed in this document. The processor(s) 102 and the memory(s) 104 may be a part of a communication modem/circuit/chip designed to implement RAT (e.g., LTE or NR). The transceiver(s) 106 may be connected to the processor(s) 102 and transmit and/or receive wireless signals through the one or more antennas 108. Each of the transceiver(s) 106 may include a transmitter and/or a receiver. The transceiver(s) 106 may be interchangeably used with radio frequency (RF) unit(s). In the present disclosure, the wireless device may be a communication modem/circuit/chip.

The second wireless device 200 may include one or more processors 202 and one or more memories 204, and further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operation flowcharts disclosed in this document. For example, the processor(s) 202 may process information in the memory(s) 204 to generate third information/signals and then transmit wireless signals including the third information/signals through the transceiver(s) 206. The processor(s) 202 may receive wireless signals including fourth information/signals through the transceiver(s) 106 and then store information obtained by processing the fourth information/signals in the memory(s) 204. The memory(s) 204 may be connected to the processor(s) 202 and store various pieces of information related to operations of the processor(s) 202. For example, the memory(s) 204 may store software code including instructions for performing all or a part of processes controlled by the processor(s) 202 or for performing the descriptions, functions, procedures, proposals, methods, and/or operation flowcharts disclosed in this document. The processor(s) 202 and the memory(s) 204 may be a part of a communication modem/circuit/chip designed to implement RAT (e.g., LTE or NR). The transceiver(s) 206 may be connected to the processor(s) 202 and transmit and/or receive wireless signals through the one or more antennas 208. Each of the transceiver(s) 206 may include a transmitter and/or a receiver. The transceiver(s) 206 may be interchangeably used with RF unit(s). In the present disclosure, the wireless device may be a communication modem/circuit/chip.

Now, hardware elements of the wireless devices 100 and 200 will be described in greater detail. One or more protocol layers may be implemented by, not limited to, one or more processors 102 and 202. For example, the one or more processors 102 and 202 may implement one or more layers (e.g., functional layers such as physical (PHY), medium access control (MAC), radio link control (RLC), packet data convergence protocol (PDCP), RRC, and service data adaptation protocol (SDAP)). The one or more processors 102 and 202 may generate one or more protocol data units (PDUs) and/or one or more service data Units (SDUs) according to the descriptions, functions, procedures, proposals, methods, and/or operation flowcharts disclosed in this document. The one or more processors 102 and 202 may generate messages, control information, data, or information according to the descriptions, functions, procedures, proposals, methods, and/or operation flowcharts disclosed in this document and provide the messages, control information, data, or information to one or more transceivers 106 and 206. The one or more processors 102 and 202 may generate signals (e.g., baseband signals) including PDUs, SDUs, messages, control information, data, or information according to the descriptions, functions, procedures, proposals, methods, and/or operation flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operation flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. For example, one or more application specific integrated circuits (ASICs), one or more digital signal processors (DSPs), one or more digital signal processing devices (DSPDs), one or more programmable logic devices (PLDs), or one or more field programmable gate arrays (FPGAs) may be included in the one or more processors 102 and 202. The descriptions, functions, procedures, proposals, methods, and/or operation flowcharts disclosed in this document may be implemented using firmware or software, and the firmware or software may be configured to include the modules, procedures, or functions. Firmware or software configured to perform the descriptions, functions, procedures, proposals, methods, and/or operation flowcharts disclosed in this document may be included in the one or more processors 102 and 202 or may be stored in the one or more memories 104 and 204 and executed by the one or more processors 102 and 202. The descriptions, functions, procedures, proposals, methods, and/or operation flowcharts disclosed in this document may be implemented using firmware or software in the form of code, an instruction, and/or a set of instructions.

The one or more memories 104 and 204 may be connected to the one or more processors 102 and 202 and store various types of data, signals, messages, information, programs, code, instructions, and/or commands. The one or more memories 104 and 204 may be configured to include read-only memories (ROMs), random access memories (RAMs), electrically erasable programmable read-only memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or wireless signals/channels, mentioned in the methods and/or operation flowcharts of this document, to one or more other devices. The one or more transceivers 106 and 206 may receive user data, control information, and/or wireless signals/channels, mentioned in the descriptions, functions, procedures, proposals, methods, and/or operation flowcharts disclosed in this document, from one or more other devices. For example, the one or more transceivers 106 and 206 may be connected to the one or more processors 102 and 202 and transmit and receive wireless signals. For example, the one or more processors 102 and 202 may perform control so that the one or more transceivers 106 and 206 may transmit user data, control information, or wireless signals to one or more other devices. The one or more processors 102 and 202 may perform control so that the one or more transceivers 106 and 206 may receive user data, control information, or wireless signals from one or more other devices. The one or more transceivers 106 and 206 may be connected to the one or more antennas 108 and 208 and the one or more transceivers 106 and 206 may be configured to transmit and receive user data, control information, and/or wireless signals/channels, mentioned in the descriptions, functions, procedures, proposals, methods, and/or operation flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received wireless signals/channels from RF band signals into baseband signals in order to process received user data, control information, and wireless signals/channels using the one or more processors 102 and 202. The one or more transceivers 106 and 206 may convert the user data, control information, and wireless signals/channels processed using the one or more processors 102 and 202 from the baseband signals into the RF band signals. To this end, the one or more transceivers 106 and 206 may include (analog) oscillators and/or filters.

5. Use Case of Wireless Device to which Present Disclosure is Applied

Figure 13:
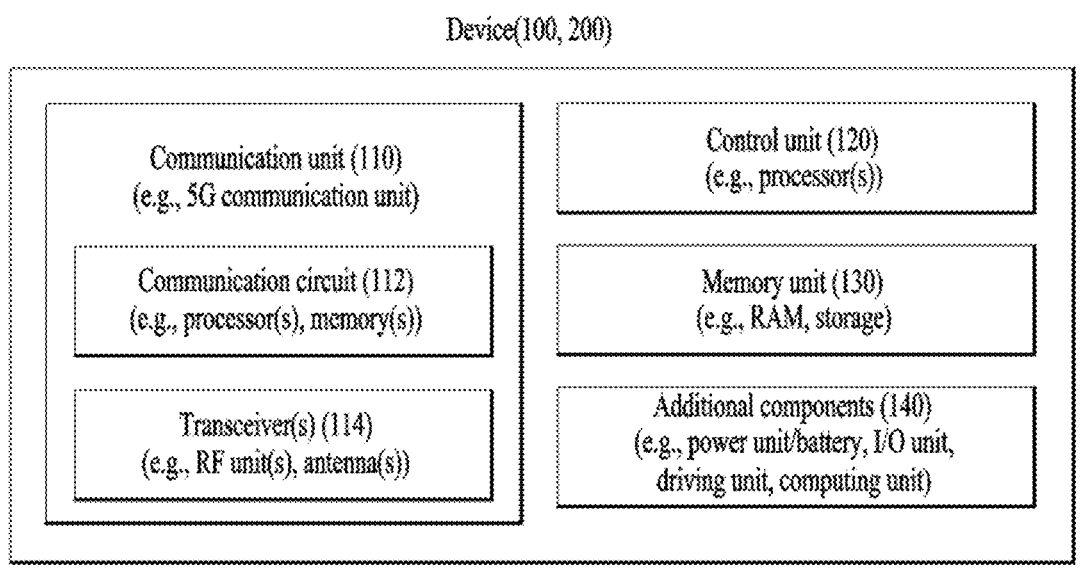
FIG. 13 illustrates another example of a wireless device applied to the present disclosure.

FIG. 13 illustrates another example of a wireless device applied to the present disclosure. The wireless device may be implemented in various forms according to a use case/service (refer to FIG. 11).

Referring to FIG. 13, wireless devices 100 and 200 may correspond to the wireless devices 100 and 200 of FIG. 19 and may be configured to include various elements, components, units/portions, and/or modules. For example, each of the wireless devices 100 and 200 may include a communication unit 110, a control unit 120, a memory unit 130, and additional components 140. The communication unit 110 may include a communication circuit 112 and transceiver(s) 114. For example, the communication circuit 112 may include the one or more processors 102 and 202 and/or the one or more memories 104 and 204 of FIG. 21. For example, the transceiver(s) 114 may include the one or more transceivers 106 and 206 and/or the one or more antennas 108 and 208 of FIG. 13. The control unit 120 is electrically connected to the communication unit 110, the memory 130, and the additional components 140 and provides overall control to the wireless device. For example, the control unit 120 may control an electric/mechanical operation of the wireless device based on programs/code/instructions/information stored in the memory unit 130. The control unit 120 may transmit the information stored in the memory unit 130 to the outside (e.g., other communication devices) via the communication unit 110 through a wireless/wired interface or store, in the memory unit 130, information received through the wireless/wired interface from the outside (e.g., other communication devices) via the communication unit 110.

The additional components 140 may be configured in various manners according to type of the wireless device. For example, the additional components 140 may include at least one of a power unit/battery, input/output (I/O) unit, a driving unit, and a computing unit. The wireless device may be implemented in the form of, not limited to, the robot (100a of FIG. 11), the vehicles (100b-1 and 100b-2 of FIG. 11), the XR device (100c of FIG. 11), the hand-held device (100d of FIG. 11), the home appliance (100e of FIG. 11), the IoT device (100f of FIG. 11), a digital broadcasting terminal, a hologram device, a public safety device, an MTC device, a medical device, a FinTech device (or a finance device), a security device, a climate/environment device, the AI server/device (400 of FIG. 11), the BSs (200 of FIG. 11), a network node, or the like. The wireless device may be mobile or fixed according to a use case/service.

In FIG. 13, all of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module in the wireless devices 100 and 200 may further include one or more elements. For example, the control unit 120 may be configured with a set of one or more processors. For example, the control unit 120 may be configured with a set of a communication control processor, an application processor, an electronic control unit (ECU), a graphical processing unit, and a memory control processor. In another example, the memory 130 may be configured with a RAM, a dynamic RAM (DRAM), a ROM, a flash memory, a volatile memory, a non-volatile memory, and/or a combination thereof.

Hereinafter, the implementation example of FIG. 13 will be described in more detail with reference to the drawings.

5.1. Example of a Hand-Held Device to which Present Disclosure is Applied

Figure 14:
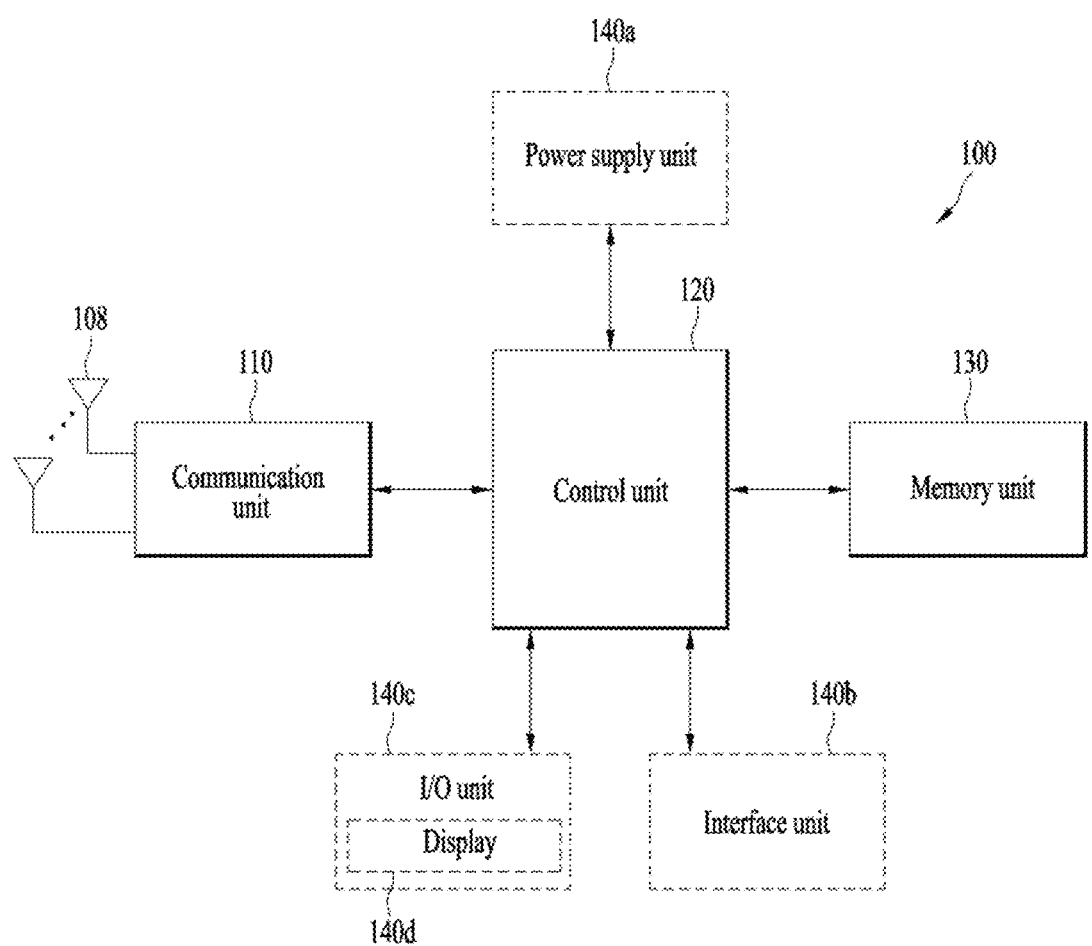
FIG. 14 illustrates a hand-held device applied to the present disclosure.

FIG. 14 illustrates a hand-held device applied to the present disclosure. The hand-held device may include a smartphone, a smartpad, a wearable device (e.g., a smartwatch or smartglasses), or a portable computer (e.g., a notebook). The hand-held device may be referred to as a mobile station (MS), a user terminal (UT), a mobile subscriber station (MSS), a subscriber station (SS), an advanced mobile station (AMS), or a wireless terminal (WT).

Referring to FIG. 14, a hand-held device 100 may include an antenna unit 108, a communication unit 110, a control unit 120, a memory unit 130, a power supply unit 140a, an interface unit 140b, and an input/output (I/O) unit 140c. The antenna unit 108 may be configured as a part of the communication unit 110. Blocks 110 to 130/140a to 140c correspond to the blocks 110 to 130/140 of FIG. 11, respectively.

The communication unit 110 may transmit and receive signals (e.g., data and control signals) to and from other wireless devices or BSs. The control unit 120 may perform various operations by controlling constituent elements of the hand-held device 100. The control unit 120 may include an application processor (AP). The memory unit 130 may store data/parameters/programs/code/instructions needed to drive the hand-held device 100. The memory unit 130 may also store input/output data/information. The power supply unit 140a may supply power to the hand-held device 100 and include a wired/wireless charging circuit, a battery, etc. The interface unit 140b may support connection of the hand-held device 100 to other external devices. The interface unit 140b may include various ports (e.g., an audio I/O port and a video I/O port) for connection to external devices. The I/O unit 140c may input or output video information/signals, audio information/signals, data, and/or information input by a user. The I/O unit 140c may include a camera, a microphone, a user input unit, a display unit 140d, a speaker, and/or a haptic module.

As an example, in the case of data communication, the I/O unit 140c may acquire information/signals (e.g., touch, text, voice, images, or video) input by a user and the acquired information/signals may be stored in the memory unit 130. The communication unit 110 may covert the information/signals stored in the memory into radio signals and transmit the converted radio signals to other wireless devices directly or to the BS. The communication unit 110 may receive radio signals from other wireless devices or the BS and then restore the received radio signals into original information/signals. The restored information/signals may be stored in the memory unit 130 and may be output as various types (e.g., text, voice, image, video, or haptic type) through the I/O unit 140c.

Figure 15:
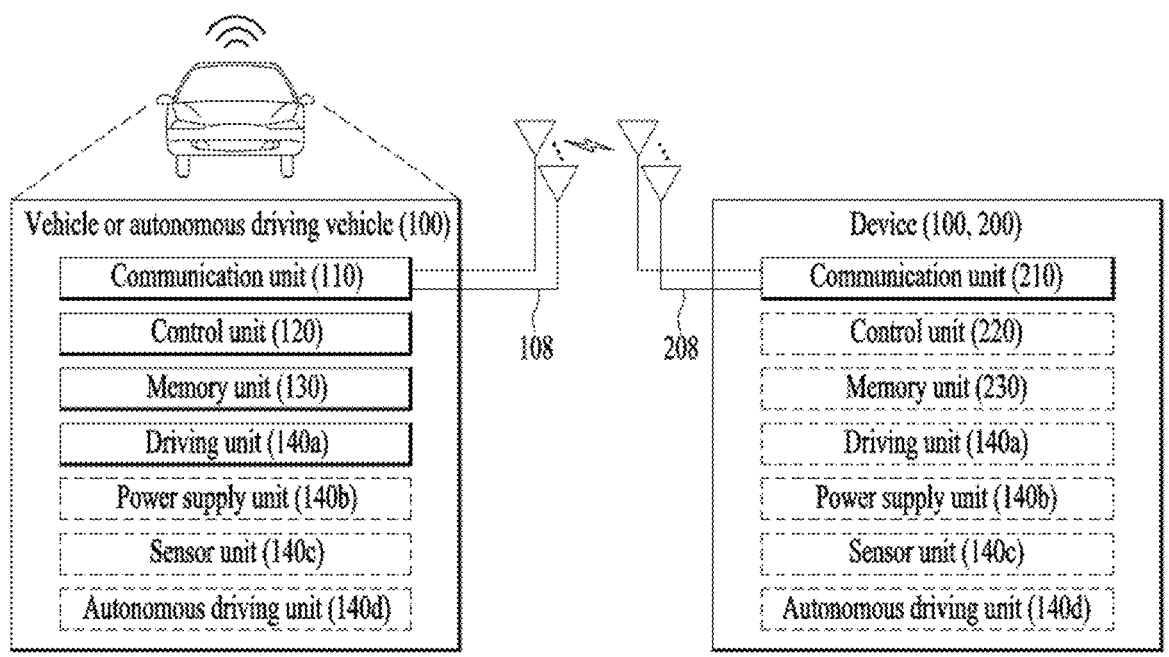
FIG. 15 illustrates a vehicle or an autonomous driving vehicle applied to the present disclosure.

5.2. Example of Vehicle or Autonomous Driving Vehicle to which Present Disclosure is Applied FIG. 15 illustrates a vehicle or an autonomous driving vehicle applied to the present disclosure. The vehicle or autonomous driving vehicle may be implemented as a mobile robot, a car, a train, a manned/unmanned aerial vehicle (AV), a ship, or the like.

Referring to FIG. 15, a vehicle or autonomous driving vehicle 100 may include an antenna unit 108, a communication unit 110, a control unit 120, a driving unit 140a, a power supply unit 140b, a sensor unit 140c, and an autonomous driving unit 140d. The antenna unit 108 may be configured as a part of the communication unit 110. The blocks 110/130/140a to 140d correspond to the blocks 110/130/140 of FIG. 14, respectively.

The communication unit 110 may transmit and receive signals (e.g., data and control signals) to and from external devices such as other vehicles, BSs (e.g., gNBs and road side units), and servers. The control unit 120 may perform various operations by controlling elements of the vehicle or the autonomous driving vehicle 100. The control unit 120 may include an ECU. The driving unit 140a may enable the vehicle or the autonomous driving vehicle 100 to drive on a road. The driving unit 140a may include an engine, a motor, a powertrain, a wheel, a brake, a steering device, and so on. The power supply unit 140b may supply power to the vehicle or the autonomous driving vehicle 100 and include a wired/wireless charging circuit, a battery, and so on. The sensor unit 140c may acquire information about a vehicle state, ambient environment information, user information, and so on. The sensor unit 140c may include an inertial measurement unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, and so on. The autonomous driving unit 140d may implement technology for maintaining a lane on which the vehicle is driving, technology for automatically adjusting speed, such as adaptive cruise control, technology for autonomously driving along a determined path, technology for driving by automatically setting a route if a destination is set, and the like.

For example, the communication unit 110 may receive map data, traffic information data, and so on from an external server. The autonomous driving unit 140*d* may generate an autonomous driving route and a driving plan from the obtained data. The control unit 120 may control the driving unit 140*a* such that the vehicle or autonomous driving vehicle 100 may move along the autonomous driving route according to the driving plan (e.g., speed/direction control). During autonomous driving, the communication unit 110 may aperiodically/periodically acquire recent traffic information data from the external server and acquire surrounding traffic information data from neighboring vehicles. During autonomous driving, the sensor unit 140*c* may obtain information about a vehicle state and/or surrounding environment information. The autonomous driving unit 140*d* may update the autonomous driving route and the driving plan based on the newly obtained data/information. The communication unit 110 may transfer information about a vehicle position, the autonomous driving route, and/or the driving plan to the external server. The external server may predict traffic information data using AI technology based on the information collected from vehicles or autonomous driving vehicles and provide the predicted traffic information data to the vehicles or the autonomous driving vehicles.

Those skilled in the art will appreciate that the present disclosure may be carried out in other specific ways than those set forth herein without departing from the spirit and essential characteristics of the present disclosure. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein.

INDUSTRIAL APPLICABILITY

Embodiments of the present disclosure are applicable to various wireless access systems including a 3GPP system, and/or a 3GPP2 system. The embodiments of the present disclosure are applicable not only to the various wireless access systems but also to all technical fields to which the wireless access systems are applied. Furthermore, the proposed methods may also be applied to a millimeter wave (mmWave) communication system using an ultra-high frequency band.

Additionally, the embodiments of the present disclosure are applicable to various applications such as an autonomous-driving vehicle, a drone, etc.

The invention claimed is:

1. An operation method of a user equipment (UE) based on one primary cell (PCell) and one or more secondary cells (SCells) in a wireless communication system, the operation method comprising:
   detecting occurrence of beam failure of a first S Cell among the one or more SCells;
   performing beam failure recovery (BFR) for the first SCell using a physical random access channel (PRACH) resource related to the PCell on the PCell; and
   based on a relationship between a first reference signal associated with the PRACH resource on which the BFR is successful and a second reference signal included in a reference signal set related to the first SCell, (i) changing an uplink beam of the first SCell based on the PRACH resource on which the BFR is successful or (ii) maintaining the uplink beam of the first SCell.

2. The method of claim 1, wherein detecting occurrence of beam failure of the first SCell includes:
   declaring one beam failure instance, by a physical layer of the UE, based on quality of all physical downlink control channel (PDCCH) signals related to the first SCell being equal to or less than a predetermined threshold; and
   declaring beam failure, by a media access control (MAC) layer of the UE, based on occurrence of the beam failure instance by a preset number of times.

3. The method of claim 1, wherein the PRACH resource used for the BFR for the first SCell:
   (i) has a correlation relation with a reference signal related to the PCell, and
   (ii) is related to a PRACH resource for contention-based random access (CBRA).

4. The method of claim 1, wherein the reference signal set related to the first SCell is configured through higher-layer signaling received from a base station.

5. The method of claim 1,
   wherein, based on the first reference signal having a spatial quasi-colocation (QCL) relation with any one second reference signal included in the reference signal set related to the first SCell, the UE changes the uplink beam of the first SCell based on the PRACH resource on which the BFR is successful, and
   wherein, based on the first reference signal having no spatial QCL with all second reference signals included in the reference signal set related to the first SCell, the UE maintains the uplink beam of the first SCell.

6. The method of claim 5, wherein, based on the first signal having the spatial QCL relation with any one second reference signal included in the reference signal set related to the first SCell, the UE changes the uplink beam of the first SCell based on the PRACH resource on which the BFR is successful, after a predetermined number of symbols from a time at which the UE receives a random access channel (RACH) response (RAR) from a base station.

7. The method of claim 5, wherein, based on the first reference signal having no spatial QCL relation with all second reference signals included in the reference signal set related to the first SCell, the operation further includes: transmitting a first signal including at least one of (i) identification information of the first SCell, (ii) information indicating that beam failure of the first SCell has occurred, and (iii) beam information related to the first SCell preferred by the UE, to a base station, as a response to random access channel (RACH) response (RAR); and expecting that the uplink beam of the first SCell will be reconfigured through a second signal related to a response signal to the first signal.

8. The method of claim 1, wherein the uplink beam of the first SCell is related to a physical uplink control channel (PUCCH) beam of the first SCell.

9. A user equipment (UE) operating based on one primary cell (PCell) and one or more secondary cells (SCells) in a wireless communication system, the UE comprising: at least one transmitter; at least one receiver; at least one processor; and at least one memory operably connected to the at least one processor, for storing instructions for causing the at least one processor to perform a specific operation when the instructions are executed, wherein the specific operation includes:
   detecting occurrence of beam failure of a first SCell among the one or more SCells;

performing beam failure recovery (BFR) for the first SCell using a physical random access channel (PRACH) resource related to the PCell on the PCell; and based on a relationship between a first reference signal associated with the PRACH resource on which the BFR is successful and a second reference signal included in a reference signal set related to the first SCell, (i) changing an uplink beam of the first SCell based on the PRACH resource on which the BFR is successful or (ii) maintaining the uplink beam of the first SCell.

10. The UE of claim 9, wherein the UE communicates with at least one of a mobile terminal, a network, or an autonomous driving vehicle other than a vehicle in which the UE is included.

11. The UE of claim 9, wherein detecting occurrence of beam failure of the first SCell includes:

declaring one beam failure instance, by a physical layer of the UE, based on quality of all physical downlink control channel (PDCCH) signals related to the first SCell being equal to or less than a predetermined threshold; and declaring beam failure, by a media access control (MAC) layer of the UE, based on occurrence of the beam failure instance by a preset number of times.

12. The UE of claim 9, wherein the PRACH resource used for the BFR for the first SCell:
(i) has a correlation relation with a reference signal related to the PCell, and
(ii) is related to a PRACH resource for contention-based random access (CBRA).

13. The UE of claim 9, wherein the reference signal set related to the first SCell is configured through higher-layer signaling received from a base station.

14. The UE of claim 9,
wherein, based on the first reference signal having a spatial quasi-colocation (QCL) relation with any one second reference signal included in the reference signal set related to the first SCell, the UE changes the uplink beam of the first SCell based on the PRACH resource on which the BFR is successful, and, wherein, based on the first reference signal having no spatial QCL with all second reference signals included in the reference signal set related to the first SCell, the UE maintains the uplink beam of the first SCell.

15. The UE of claim 14, wherein, based on the first signal having the spatial QCL relation with any one second reference signal included in the reference signal set related to the first SCell, the UE changes the uplink beam of the first SCell based on the PRACH resource on which the BFR is successful, after a predetermined number of symbols from a time at which the UE receives a random access channel (RACH) response (RAR) from a base station.

16. The UE of claim 14, wherein, based on the first reference signal having no spatial QCL relation with all second reference signals included in the reference signal set related to the first SCell, the specific operation further includes:

transmitting a first signal including at least one of (i) identification information of the first SCell, (ii) information indicating that beam failure of the first SCell has occurred, and (iii) beam information related to the first SCell preferred by the UE, to a base station, as a response to random access channel (RACH) response (RAR); and expecting that the uplink beam of the first SCell will be reconfigured through a second signal related to a response signal to the first signal.

17. The UE of claim 9, wherein the uplink beam of the first SCell is related to a physical uplink control channel (PUCCH) beam of the first SCell.

* * * * *